US009786913B2

(12) United States Patent
Inoue et al.

(10) Patent No.: US 9,786,913 B2
(45) Date of Patent: Oct. 10, 2017

(54) CATHODE ACTIVE MATERIAL FOR NON-AQUEOUS ELECTROLYTE RECHARGEABLE BATTERY AND MANUFACTURING METHOD FOR SAME, AND NON-AQUEOUS ELECTROLYTE RECHARGEABLE BATTERY

(71) Applicant: SUMITOMO METAL MINING CO., LTD., Tokyo (JP)

(72) Inventors: Katsuya Inoue, Ehime (JP); Hiroyuki Toya, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/907,005

(22) PCT Filed: Jul. 22, 2014

(86) PCT No.: PCT/JP2014/069374
§ 371 (c)(1),
(2) Date: Jan. 22, 2016

(87) PCT Pub. No.: WO2015/012284
PCT Pub. Date: Jan. 29, 2015

(65) Prior Publication Data
US 2016/0164093 A1    Jun. 9, 2016

(30) Foreign Application Priority Data

Jul. 24, 2013 (JP) ................................. 2013-153891

(51) Int. Cl.
*H01M 2/00* (2006.01)
*H01M 4/525* (2010.01)
(Continued)

(52) U.S. Cl.
CPC ............ *H01M 4/525* (2013.01); *C01G 53/00* (2013.01); *C01G 53/006* (2013.01); *C01G 53/50* (2013.01);
(Continued)

(58) Field of Classification Search
CPC ...... H01M 4/505; H01M 4/525; H01M 4/366; C01P 2002/50; C01P 2002/74
See application file for complete search history.

(56) References Cited

U.S. PATENT DOCUMENTS

2005/0142442 A1    6/2005    Yuasa et al.
2011/0193013 A1*   8/2011    Paulsen ................. B82Y 30/00
                                                 252/182.1

(Continued)

FOREIGN PATENT DOCUMENTS

CN    1430298 A      7/2003
CN    102119128 A    7/2011
(Continued)

OTHER PUBLICATIONS

International Search Report and Written Opinion dated Nov. 25, 2014, from the corresponding PCT/JP2014/069374.
(Continued)

*Primary Examiner* — Mark F Huff
*Assistant Examiner* — Monique Wills
(74) *Attorney, Agent, or Firm* — Katten Muchin Rosenman LLP

(57) ABSTRACT

To provide a cathode active material for a non-aqueous electrode rechargeable battery, with which it is possible to improve input/output characteristics, particularly by reducing resistance in a low SOC state in which DCIR increases, and to provide a manufacturing method for same. The cathode active material includes layered hexagonal crystal lithium nickel manganese composite oxide particles repre- (Continued)

sented by the general formula (A): $Li_{1+u}Ni_xMn_yCo_zM_tO_2$ (where $0 \leq u \leq 0.20$, $x+y+z+t=1$, $0.30 \leq x \leq 0.70$, $0.10 \leq y \leq 0.55$, $0 \leq z \leq 0.40$, $0 \leq t \leq 0.10$, and M is one or more elements selected from Al, Ti, V, Cr, Zr, Nb, Mo, and W), and further including Na, Mg, Ca and $SO_4$, in which the total amount of Na, Mg and Ca is 0.01 to 0.1 mass %, the amount of $SO_4$ is 0.1 to 1.0 mass %, and the ratio of the integrated intensity of the diffraction peak on plane (003) to that on plane (104) obtained by powder X-ray diffraction measurement using CuKα rays is 1.20 or greater.

13 Claims, 1 Drawing Sheet

(51) Int. Cl.
*C01G 53/00* (2006.01)
*H01M 4/505* (2010.01)
*H01M 4/36* (2006.01)
*H01M 4/02* (2006.01)

(52) U.S. Cl.
CPC .......... *H01M 4/366* (2013.01); *H01M 4/505* (2013.01); *C01P 2002/50* (2013.01); *C01P 2002/60* (2013.01); *C01P 2002/74* (2013.01); *C01P 2004/50* (2013.01); *C01P 2004/61* (2013.01); *C01P 2006/12* (2013.01); *C01P 2006/40* (2013.01); *H01M 2004/028* (2013.01)

(56) References Cited

U.S. PATENT DOCUMENTS

| | | |
|---|---|---|
| 2013/0130090 A1 | 5/2013 | Takamori et al. |
| 2013/0313471 A1 | 11/2013 | Endo et al. |
| 2014/0205901 A1 | 7/2014 | Nagai et al. |

FOREIGN PATENT DOCUMENTS

| | | |
|---|---|---|
| CN | 102754251 A | 10/2012 |
| JP | H10308218 A | 11/1998 |
| JP | 2000-195514 | 7/2000 |
| JP | 2003-077460 A | 3/2003 |
| JP | 2005-197004 A | 7/2005 |
| JP | 2007-123255 A | 5/2007 |
| JP | 2012-3948 | 1/2012 |
| JP | 2012-252964 A | 12/2012 |
| JP | 2013-51172 A | 3/2013 |
| WO | 2012/091015 A1 | 7/2012 |

OTHER PUBLICATIONS

The First Office Action dated Mar. 17, 2017, from the corresponding CN201480045922.2.

* cited by examiner

CATHODE ACTIVE MATERIAL FOR NON-AQUEOUS ELECTROLYTE RECHARGEABLE BATTERY AND MANUFACTURING METHOD FOR SAME, AND NON-AQUEOUS ELECTROLYTE RECHARGEABLE BATTERY

TECHNICAL FIELD

The present invention relates to a cathode active material for a non-aqueous electrolyte rechargeable battery and manufacturing method thereof, and to a non-aqueous electrolyte rechargeable battery that uses that cathode active material as cathode material.

BACKGROUND ART

In recent years, with the spread of portable electronic devices such as portable telephones, notebook personal computers and the like, there is a large need for development of compact and lightweight secondary batteries having a high energy density. Moreover, there is a large need for high-output secondary batteries as the batteries for power supplies of motor drives, and particularly for power supplies for transport equipment.

As a rechargeable battery that satisfies such a demand is a lithium-ion rechargeable battery that is one kind of a non-aqueous electrolyte rechargeable battery. This lithium-ion rechargeable battery includes an anode, a cathode, an electrolyte and the like; and a material for which extraction and insertion of lithium is possible is used as the active material that is used as the material for the anode and cathode.

Currently, much research is being performed for various kinds of lithium-ion batteries, and of that research, a lithium-ion rechargeable battery in which a layered-type or spinel-type lithium composite metal oxide is used as the cathode material is capable of obtaining a high 4V class voltage, so application as a battery having high energy density is being advanced.

Currently, as the cathode material for this kind of lithium-ion rechargeable battery, lithium composite oxides such as lithium cobalt composite oxide ($LiCoO_2$) for which synthesis is comparatively easy, lithium nickel composite oxide ($LiNiO_2$) in which nickel that is less expensive than cobalt is used, lithium nickel cobalt manganese composite oxide ($LiNi_{1/3}Co_{1/3}Mn_{1/3}O_2$), lithium manganese composite oxide ($LiMn_2O_4$) that uses manganese, lithium nickel manganese composite oxide ($LiNi_{0.5}Mn_{0.5}O_2$), and the like are proposed. Of these, lithium nickel cobalt manganese composite oxide is gaining attention as a cathode material that has good charge/discharge cycling characteristics, low resistance, and from which high output can be obtained. Moreover, tests for increasing the performance by introducing various additional elements into this lithium nickel cobalt manganese composite oxide are being performed.

For example, JP 2012252964 (A) discloses being able to reduce the cathode resistance while maintaining the initial discharge capacity, and improve the capacity retention after a cycling test by including at least 0.02 mol % to 1 mol % of calcium and 0.05 mol % or less of magnesium in the lithium nickel cobalt manganese composite oxide. Moreover, JP 2012252964 (A) discloses being able to promote crystal growth during calcination by including 0.08 mol % to 1 mol % of sodium. Furthermore, JP 2012252964 (A) discloses being able to prevent a decrease in crystallinity and a decrease in battery characteristics that is due to that decrease in crystallinity by controlling the amount of $SO_4$ included to be 1% by mass or less.

On the other hand, research is not simply being performed in regard to the introduction of additional elements into the lithium nickel cobalt manganese composite oxide, but research that is focusing on the crystal forms is also being performed.

For example, JP 2003077460 (A) proposes a cathode active material, wherein, of the lithium nickel cobalt composite oxide of the cathode active material that includes lithium niobate, when the X-ray diffraction peak intensity on plane (003) is taken to be $I_{(003)}$, the X-ray diffraction peak intensity on plane (104) is taken to be $I_{(104)}$, and the maximum X-ray diffraction peak attributing to the lithium niobate is taken to be $I_{Nb}$, the ratios of these peak intensities are: $I_{(003)}/I_{(104)}$ is 1.6 or greater, and $0.01 \leq I_{Nb}/I_{(003)} \leq 0.03$. According to JP 2003077460 (A), when using this kind of cathode active material in a non-aqueous electrolyte rechargeable battery, damage or fire does not occur even when there is internal shorting, so it is possible to improve safety.

JP 2007123255 (A) proposes a lithium transition metal composite oxide that is expressed as $Li_{1+x}M_{1-x}O_2$ (where M is at least one kind of transition metal that is selected from among Ni, Mn, Co, Fe, Cu, Zn, Cr, Ti, and Zr, and $0 \leq x \leq 0.15$), the amount of acid radical (sulfate radical: $SO_3$, chlorine radical: Cl) included being 1500 ppm or less, the amount of alkali metal (Na, K) included being 2000 ppm or less, and the peak intensity ratio $I_{(003)}/I_{(104)}$ of X-ray diffraction peaks on plane (003) and plane (104) attributed to the hexagonal crystals being 1.4 or greater. Of this lithium transition metal composite oxide, not only is it possible to make the discharge capacity large even when the amount of cobalt included is reduced, but it is also possible to achieve excellent discharge rate characteristics.

In addition, JP H10308218 (A) proposes a lithium composite oxide for which it is possible to obtain both improved thermal stability and charge/discharge cycling characteristics when charging the lithium-ion rechargeable battery by regulating the crystallite size that is calculated from plane (003) using the Scherrer formula and the crystallite size that is calculated from plane (110) using the Scherrer formula to be within a specified range.

In these documents, even though improving the safety and discharge capacity by regulating the peak intensity ratio of specified planes of lithium composite oxide is proposed, improvement of the input/output characteristics of a lithium-ion rechargeable battery has not been studied sufficiently. On the other hand, with the worldwide spread of portable electronic devices and electric automobiles, there is a need for further improvement of input/output characteristics of the lithium-ion secondary batteries that are used in these devices.

Here, the input/output characteristics of a lithium-ion rechargeable battery are known to have a strong correlation with the direct-current resistance (DCIR) that is expressed as the resistance of the overall battery. Therefore, in order to improve the input/output characteristics, reducing the DCIR is important. Particularly, in a state in which the charging depth (SOC) at the end of discharge is low, the DCIR becomes large, so improving the DCIR in this low SOC state is important for improving the battery characteristics.

For example, JP 2005197004 (A) discloses a layered lithium nickel manganese composite oxide that is expressed by the compositional formula: $Li_aMn_xNi_yCo_zO_2$ (where $0<a \leq 1.2$, $0.1 \leq x \leq 0.9$, $0 \leq y \leq 0.44$, $0.1 \leq z \leq 0.6$, and $x+y+z=1$), and of which the ratio of the peak intensity ($I_{(003)}$) on plane (003) of the X-ray diffraction pattern on plane (003) and peak intensity ($I_{(104)}$) on plane (104) is controlled to be no less than 1.0 and no greater than 1.5, and the specific surface area is controlled to be 0.6 m²/g to 1.5 m²/g. JP 2005197004 (A) discloses that it is possible to obtain this kind of lithium nickel manganese composite oxide by performing calcination of the raw material that has a small particle size for 10 hours to 50 hours at 950° C. or greater, and preferably at 1000° C. to 1100° C.

Moreover, JP 2013051772 (A) discloses a lithium-ion rechargeable battery, of which the cathode active material has hollow structure, and by controlling the ratio ($FWHM_{(003)}/FWHM_{(104)}$) of the half peak width ($FWHM_{(003)}$) of the diffraction peak on plane (003) with respect to the half peak width ($FWHM_{(104)}$) of the diffraction peak on plane (104) to be 0.7 or less, the battery is able to display high output characteristics even in a low SOC state of 30% or less, and in low-temperature environments of −30° C. JP2013051772 (A) discloses that this kind of cathode active material can be obtained by mixing transition metal hydroxide that has been crystallized under specified conditions with a lithium compound, and performing calcination of that mixture in an oxidizing atmosphere for 3 hours to 20 hours at a maximum calcination temperature of 700° C. to 1000° C.

Therefore, by using the cathode active materials disclosed in the patent literature above, it is feasible that together with increasing the output of a rechargeable battery, it is possible to reduce the internal resistance at extremely low temperature (−30° C.). However, in JP 2005197004 (A), there is only an evaluation of the quantitative tendencies on plane (003) and plane (104) using the peak intensities, and there is no quantitative evaluation of the crystal planes important for the input/output characteristics, or a sufficient evaluation of the crystallinity. Moreover, in JP 2013051772 (A), the half peak widths are only used to evaluate the relative crystallinity between crystal surfaces, and even though a cathode active material with the above properties is obtained, it is not possible to obtain a sufficient effect for reducing the DCIR in a low SOC state of 20% or less.

RELATED LITERATURE

Patent Literature

[Patent Literature 1] JP 2012252964 (A)
[Patent Literature 2] JP 2003077460 (A)
[Patent Literature 3] JP 2007123255 (A)
[Patent Literature 4] JP H10308218 (A)
[Patent Literature 5] JP 2005197004 (A)
[Patent Literature 6] JP 2013051172 (A)

SUMMARY OF INVENTION

Problem to be Solved by Invention

The object of the present invention is to provide a cathode active material for a non-aqueous electrolyte rechargeable battery, and to a manufacturing method thereof that make it possible to improve the input/output characteristics of a lithium-ion battery, and particularly, make it possible to reduce resistance in a low SOC state of 20% or less at which the DCIR becomes large.

Means for Solving Problems

The cathode active material for a non-aqueous electrolyte rechargeable battery of the present invention includes: layered hexagonal crystal lithium nickel manganese composite oxide particles that are expressed by the general formula (A): $Li_{1+u}Ni_xMn_yCo_zM_tO_2$ (where $0 \leq u \leq 0.20$, $x+y+z+t=1$, $0.30 \leq x \leq 0.70$, $0.10 \leq y \leq 0.55$, $0 \leq z \leq 0.40$, $0 \leq t \leq 0.10$, and M is selected from one or more elements selected from among Al, Ti, V, Cr, Zr, Nb, Mo, and W); and further includes Na, Mg, Ca and $SO_4$; and wherein the total amount of Na, Mg and Ca included is 0.01% by mass to 0.1% by mass, and the amount of $SO_4$ included is 0.1% by mass to 1.0% by mass; and the ratio of the integrated intensity of the diffraction peak on plane (003) with respect to the integrated intensity of the diffraction peak on plane (104) that were obtained by power X-ray diffraction measurement that uses CuKα rays is 1.20 or greater.

Preferably, the crystallite size that is found from the diffraction peak on plane (003) is 80 nm to 200 nm. Moreover, preferably, the average particle size is 3 μm to 20 μm.

The manufacturing method of the present invention for a cathode active material for a non-aqueous electrolyte rechargeable battery that includes layered hexagonal crystal lithium nickel manganese composite oxide particles that are expressed by the general formula (A): $Li_{1+u}Ni_xMn_yCo_zM_tO_2$ (where $0 \leq u \leq 0.20$, $x+y+z+t=1$, $0.30 \leq x \leq 0.70$, $0.10 \leq y \leq 0.55$, $0 \leq z \leq 0.40$, $0 \leq t \leq 0.10$, and M is selected from one or more elements selected from among Al, Ti, V, Cr, Zr, Nb, Mo, and W); and further includes Na, Mg, Ca and $SO_4$; includes:

a crystallization process for obtaining nickel manganese composite hydroxide particles that include secondary particles that are formed from an aggregation of plural primary particles, and are expressed by the general formula (B): $Ni_xMn_yCo_zM_t(OH)_{2+\alpha}$ (where $x+y+z+t=1$, $0.30 \leq x \leq 0.70$, $0.10 \leq y \leq 0.55$, $0 \leq z \leq 0.40$, $0 \leq t \leq 0.10$, $0 \leq \alpha \leq 0.5$, and M is at least one element that is selected from among Al, Ti, V, Cr, Zr, Nb, Mo, and W), and further includes Na, Mg, Ca and $SO_4$, with the total amount of Na, Mg and Ca included being 0.01% by mass to 0.1% by mass, and the amount of $SO_4$ included being 0.1% by mass to 1.0% by mass;

a mixing process for obtaining a lithium mixture by mixing a lithium compound into the nickel manganese composite hydroxide particles that were obtained in the crystallization process so that the ratio of the number of atoms of Li with respect to the number of atoms of Ni, Mn, Co and M is 1: 0.95 to 1.20; and a calcination process for obtaining lithium nickel manganese composite oxide particles by performing calcination of the lithium mixture in an oxidizing atmosphere and at a calcination temperature of 850° C. to 1000° C., with $T_{ave1}$ being the average temperature during the temperature rise from 650° C. to the calcination temperature, $t_1$ being the amount of time for the temperature to rise from 650° C. to the calcination temperature, $T_{ave2}$ being the average temperature while the temperature is maintained at the calcination temperature, and $t_2$ being the amount of time that the temperature is maintained at the calcination temperature, and wherein a crystal growth index ($G_1$) that is defined by an Equation (a)

$$\text{Crystal growth index: } G_1 = T_{ave1} \times t_1^{1/2} \qquad (a)$$

is controlled so as to be 550° C.·h$^{1/2}$ to 1000° C.·h$^{1/2}$, and a crystal growth index ($G_2$) that is defined by and Equation (b)

$$\text{Crystal growth index: } G_2 = T_{ave2} \times t_2^{1/2} \qquad (b)$$

is controlled so as to be 1500° C.·h$^{1/2}$ to 3500° C.·h$^{1/2}$.

Preferably, the crystallization process is a process for crystallizing the nickel manganese composite hydroxide particles by obtaining a reaction aqueous solution by mixing together a mixed aqueous solution in which Ni, Mn, Co and M are included so that the composition ratios are expressed by the general formula (B), an ammonium-ion donor and sodium hydroxide, and controlling the temperature of the reaction aqueous solution to be 35° C. or greater, and the pH value to be 10.5 to 12.0 at a standard liquid temperature of 25° C.; and where of the metal elements of the mixed aqueous solution, at least nickel sulfate and manganese sulfate are used as the nickel source and manganese source.

Preferably, the mixed aqueous solution further includes 10 mg/L to 50 mg/L of Mg, and/or 10 mg/L to 30 mg/L of Ca.

Preferably, in the calcination process the amount of time $t_1$ for raising the temperature from 650° C. to the calcination temperature is 0.5 hours to 1.8 hours, and the amount of time $t_2$ that the temperature is maintained at the calcination temperature is 4 hours to 15 hours. Moreover, preferably, the amount of time from after the temperature reaches 650° C. to the end of calcination is 5 hours to 15 hours.

Preferably, the oxygen concentration in the oxidizing atmosphere is 18% by volume to 100% by volume.

Preferably, a heat-treatment process is further provided before the mixing process for performing heat treatment of the nickel manganese composite hydroxide particles at 105° C. to 700° C.

Preferably, lithium carbonate, lithium hydroxide or a mixture of these is used as the lithium compound.

Preferably, a crushing process is further provided after the calcination process for crushing the lithium nickel manganese composite oxide particles that were obtained in the calcination process.

Moreover, the present invention includes a cathode, an anode, a separator and a non-aqueous electrolyte, wherein the cathode active material for a non-aqueous electrolyte rechargeable battery is used as the cathode material of the cathode.

Effect of Invention

When a rechargeable battery that uses the cathode active material of the present invention is made, it is possible to improve the DCIR in low SOC states of 20% or less while maintaining high capacity, so it is possible to provide a non-aqueous electrolyte rechargeable battery having good input/output characteristics.

Moreover, with the present invention, it is possible to easily produce large amounts of cathode active material for a non-aqueous electrolyte rechargeable battery having such excellent battery characteristics, so the present invention has very large industrial significance.

MODES FOR CARRYING OUT INVENTION

Figure 1:
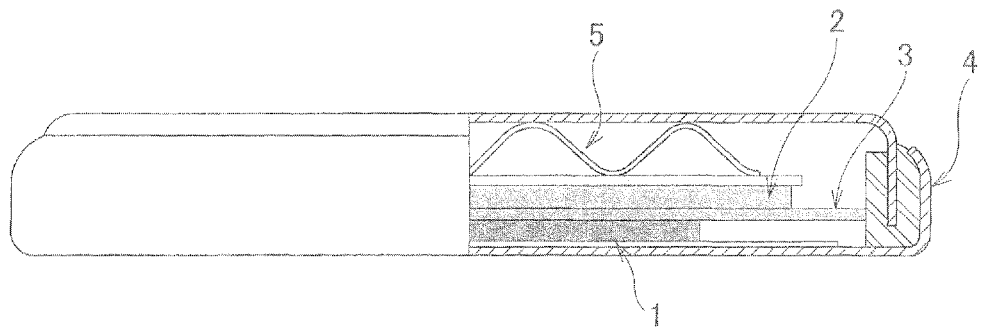
FIG. 1 schematically illustrates the cross section of a 2032 type coin cell that was used in the battery evaluation of the present invention.

The inventors, in order to solve the problems described above, diligently researched the relationship between the crystal structure of lithium nickel manganese oxide particles (hereafter, referred to as "lithium composite oxide particles") which are the cathode active material for a non-aqueous electrolyte rechargeable battery (hereafter, referred to as "cathode active material") and the direct-current resistance (DCIR) of a rechargeable battery that uses the cathode active material. As a result, it was learned that by controlling the ratio of integrated intensities of diffraction peaks that were calculated from specified planes of the obtained lithium composite oxide particles using powder X-ray diffraction measurement that uses CuKα rays, it is possible to greatly reduce the DCIR of a rechargeable battery that uses the lithium composite oxide particles as cathode active material in a state in which the charging depth (SOC) at the end of discharge is low, while maintaining high capacity.

Moreover, the inventors, based on this knowledge, diligently researched manufacturing methods for easily obtaining this kind of cathode active material in an industrial process. As a result, it was learned that by controlling the amount of sodium (Na), magnesium (Mg), and calcium (Ca) that is included in this cathode active material, it is possible to improve the capacity retention in progress of charge/discharge cycling of a battery. The present invention was achieved based on these knowledges obtained.

1. Cathode Active Material for Non-Aqueous Electrolyte Rechargeable Battery

The cathode active material of the present invention includes layered hexagonal crystal lithium composite oxide particles that are expressed by the general formula (A): $Li_{1+u}Ni_xMn_yCo_zM_tO_2$ (where $0 \leq u \leq 0.20$, $x+y+z+t=1$, $0.30 \leq x \leq 0.70$, $0.10 \leq y \leq 0.55$, $0 \leq z \leq 0.40$, $0 \leq t \leq 0.10$, and M is selected from one or more elements selected from among Al, Ti, V, Cr, Zr, Nb, Mo, and W); and further includes Na, Mg, Ca and $SO_4$. Particularly, in the cathode active material of the present invention, the total amount of Na, Mg and Ca included is 0.01% by mass to 0.1% by mass, and the amount of $SO_4$ included is 0.1% by mass to 1.0% by mass. Moreover, the ratio of the integrated intensity of the diffraction peak on plane (003) with respect to the integrated intensity of the diffraction peak on plane (104) that were obtained by power X-ray diffraction measurement that uses CuKα rays is 1.20 or greater.

(1) Composition

[Li, Ni, Mn, Co, and M]

The value of "u" that expresses the surplus amount of lithium (Li) is 0 or greater and 0.20 or less, and preferably is 0 or greater and 0.15 or less. When the value of "u" is less than 0, the cathode resistance of the non-aqueous electrolyte rechargeable battery that uses this cathode active material becomes large, so the battery output becomes low. On the other hand, when the value of "u" is greater than 0.20, not only does the initial discharge capacity of the non-aqueous electrolyte rechargeable battery that uses this cathode active material decrease, but the cathode resistance increases.

Nickel (Ni) contributes to the improvement of the battery capacity. The value of "x" that indicates the amount of Ni included is 0.30 or greater and 0.70 or less, and preferably is 0.30 or greater and 0.60 or less, and more preferably is 0.30 or greater and 0.50 or less. When the value of "x" is less than 0.30, the battery capacity of the non-aqueous electrolyte rechargeable battery that uses this cathode active material decreases. On the other hand, when the value of "x" is greater than 0.70, the amount of additional elements that will be described later decreases, and so there is a possibility that it will not be possible to sufficiently obtain the effect of adding additional elements.

Manganese (Mn) is an element that contributes to the improvement of thermal stability. The value "y" that indicates the amount of Mn included is 0.10 or greater and 0.55 or less, and preferably is 0.20 or greater and 0.50 or less, and more preferably is 0.30 or greater and 0.40 or less. When the value of "y" is less than 0.10, the effect of adding Mn is not sufficiently obtained. On the other hand, when the vale of "y" is greater than 0.55, Mn elutes from the cathode active material during high-temperature operation, and the charge/discharge cycling characteristics worsen.

Cobalt (Co) is an element that contributes to the improvement of the charge/discharge cycling characteristics. By including a proper amount of Co, the cathode active material has good charge/discharge cycling characteristics, or in other words, has good durability. The value "z" that indicates the amount of Co included is 0 or greater and 0.40 or less, and preferably is 0.10 or greater and 0.40 or less, and more preferably is 0.20 or greater and 0.40 or less. When the value of "z" is greater than 0.40, the initial discharge capacity of the non-aqueous electrolyte rechargeable battery that uses this cathode active material greatly decreases. In the present invention, Co is not an essential element, however, from the aspect of obtaining sufficient charge/discharge cycling characteristics and preventing a decrease in the capacity retention, the value of "z" is preferably 0.10 or greater, and more preferably 0.20 or greater.

As the additional elements (M), it is possible to use one or more elements selected from among aluminum (Al), titanium (Ti), vanadium (V), chromium (Cr), zirconium (Zr), niobium (Nb), molybdenum (Mo), and tungsten (W). These additional elements are elements that are appropriately selected according to the use and desired performance of the rechargeable battery that uses the obtained cathode active material.

The value "t" that indicates the amount of additional elements included is 0 or greater and 0.10 or less, and preferably is 0.001 or greater and 0.05 or less. When the value "t" is greater than 0.10, the amount of metal elements that contribute to the Redox reaction is reduced, so the battery capacity decreases.

In a crystallization process that will be described later, the additional elements (M) are crystallized together with the nickel, cobalt and manganese, and can be evenly dispersed in the nickel cobalt manganese composite hydroxide particles (hereafter, referred to as "composite hydroxide particles"), however, it is also possible to cover the surface of the composite hydroxide particles with the additional elements (M) after the crystallization process. Moreover, it is also possible to mix the composite hydroxide particles with the lithium compound in a mixing process, and it is also possible to use these methods together. No matter which method is used, the amount of additional elements (M) included must be adjusted so as to obtain the composition of general formula (A).

The composition of each of the components in the cathode active material can be measured using an ICP atomic emission spectrometry analysis method. This is also true for Na, Mg, Ca and $SO_4$ described later.

[Na, Mg, and Ca]

By including specified amounts of Na, Mg and Ca in the cathode active material of the present invention, it is possible to improve the capacity retention during the charge/discharge cycle of a non-aqueous electrolyte rechargeable battery that uses this cathode active material without a large decrease in the initial discharge capacity of the rechargeable battery. This is probably because distortions in the crystal structure due to the progress of charge/discharge cycle become small by dissolving sodium ions, magnesium ions and calcium ions that do not contribute to the battery reaction in Li sites.

The total amount of Na, Mg and Ca included is 0.01% by mass to 0.1% by mass, and preferably 0.01% by mass to 0.07% by mass, and more preferably 0.02% by mass to 0.07% by mass. When the total amount of Na, Mg and Ca included is less than 0.01% by mass, it is not possible to obtain a sufficient effect of improving the capacity retention. On the other hand, when the total amount of Na, Mg and Ca included is greater than 0.1% by mass, the metal elements that contribute to the Redox reaction are reduced, so the battery capacity decreases.

The amount of Na, Mg and Ca included can be adjusted in a crystallization process of composite hydroxide particles as a precursor of the cathode active material, or in a mixing process of mixing the composite hydroxide particles and lithium compound. However, Na, Mg and Ca are unavoidably included and obtained as impurities in the raw material or in a water or aqueous solution that is used in the production process, so it is necessary to adjust the amounts by taking into consideration the amounts that are unavoidably obtained from these.

[$SO_4$]

By including $SO_4$ in the cathode active material, it is possible to suppress crystal growth in the a-axis direction of the lithium nickel manganese composite oxide (hereafter, referred to as "lithium composite oxide") in the calcination process, so controlling the integrated intensity ratio $I_{(003)}/I_{(104)}$ of the diffraction peaks on the crystal planes described later becomes simple.

The amount of $SO_4$ that is included in the cathode active material is 0.1% by mass to 1.0% by mass, and preferably 0.2% by mass to 0.9% by mass, and more preferably 0.2% by mass to 0.7% by mass. When the amount of $SO_4$ is less than 0.1% by mass, it is not possible to sufficiently suppress crystal growth in the a-axis direction even though the conditions in the calcination process described later are properly controlled, and thus controlling the integrated intensity ratio to be within the desired range becomes difficult. On the other hand, when the amount of $SO_4$ included is greater than 1.0% by mass, the crystallinity decreases and thus the battery characteristics decrease.

(2) Integrated Intensity Ratio

The cathode active material of the present invention is such that the ratio of the integrated intensity $I_{(003)}$ of the diffraction peak on plane (003) with respect to the integrated intensity $I_{(104)}$ of the diffraction peak on plane (104) that are obtained by power X-ray diffraction measurement that uses CuKα rays (hereafter, referred to as the "integrated intensity ratio") $I_{(003)}/I_{(104)}$ is 1.20 or greater. Here, the integrated intensity is the surface area of the area underneath the spectrum obtained by the X-ray diffraction measurement above.

In layered hexagonal crystal oxide such as the cathode active material of the present invention, insertion and extraction of lithium ions during charging and discharging is known to occur on the "a" plane. Therefore, in order to improve the input/output characteristics of the obtained lithium-ion rechargeable battery, it is advantageous to shorten the diffusion length of the lithium ions, or to increase the surface area of the "a" plane, which is the reaction plane of the crystal. Of these, in order to improve the DCIR in a low SOC state, increasing the surface area of the "a" plane is particularly effective.

Here, it is difficult to directly evaluate the surface area of the "a" plane, however, by evaluating the degree of growth in the a-axis direction and the c-axis direction, it is possible to relatively evaluate the size of the surface area of the "a" plane. In other words, by finding the ratio of the integrated intensity $I_{(003)}$ of the diffraction peak on plane (003) that represents the growth in the c-axis direction and the integrated intensity $I_{(104)}$ of the diffraction peak on plane (104) that represents the growth in the a-axis direction, or in other words, by finding the integrated intensity ratio $I_{(003)}/I_{(104)}$, it is possible to determine the direction in which the degree of growth is large, and thus it is possible to relatively evaluate the size of the surface area of the "a" plane. In other words, when the integrated intensity ratio $I_{(003)}/I_{(104)}$ is large, it is possible to determine that growth proceeds in the c-axis direction and that the surface area of the "a" plane is large. As a result, it is possible to determine that for the rechargeable battery that uses this cathode active material, it is possible to reduce the DCIR in a low SOC state.

When evaluating the crystal growth, in evaluation of the peak intensity ratio of diffraction peaks such as disclosed in JP 2005197004 (A), when the additional elements (M) or impurities have an effect on the crystallinity of the cathode active material, there is a possibility that growth of the crystal planes cannot be evaluated sufficiently. Moreover, evaluation using the half-peak width (FWHW) such as disclosed in JP 2013051172 (A) is an evaluation of the relative crystallinity between crystal planes, and the peak intensity is not taken into consideration, so evaluation of the crystallinity is not performed from the overall diffraction peaks, and thus highly reliable evaluation is difficult. On the other hand, the integrated intensity ratio includes information about specified plane indices, so these problems do not occur, and highly reliable evaluation is possible. Therefore, in the present invention, the integrated intensity ratio is used as an index for evaluating crystal growth.

When the integrated intensity ratio $I_{(003)}/I_{(104)}$ is 1.20 or greater, the surface area of the "a" plane can be made sufficiently large, and DCIR can be reduced in a low SOC state. Therefore, it is possible to obtain a non-aqueous electrolyte rechargeable battery that has sufficient output characteristics even in a low SOC state. On the other hand, when the integrated intensity ratio is less than 1.20, the crystal growth in the c-axis direction is small, and the surface area of the "a" plane is insufficient, so it is not possible to reduce DCIR in a low SOC state.

The upper limit of the integrated intensity ratio $I_{(003)}/I_{(104)}$ is not particularly limited, however, when the integrated intensity ratio $I_{(003)}/I_{(104)}$ is too large, crystal growth in the c-axis direction proceeds excessively, and the crystallinity become unstable, so there is a possibility that the battery characteristics will worsen. Therefore, taking production restrictions into consideration, the integrated intensity ratio $I_{(003)}/I_{(104)}$ is preferably 1.50 or less, and more preferably 1.30 or less.

(3) Crystallite Size

In the lithium composite oxide particles of the cathode active material of the present invention, the crystallite size that is found from the diffraction peak on plane (003) (hereafter, referred to as the "crystallite size on plane (003)") is preferably 80 nm to 200 nm. Here, the crystallite size is a dimension that indicates the average size of a single crystal of the lithium composite oxide particles, and is an index of the crystallinity. The crystallite size can be calculated from X-ray diffraction measurement using the following Scherrer equation.

$$\text{Crystallite particle size (Angstroms)} = 0.9\lambda/(\beta \cos \theta) \quad \text{<Scherrer Equation>}$$

$\lambda$: Wavelength of the X-ray tube that is used (CuKα=1.542 Å)
$\beta$: Half-peak width of the diffraction peak from each plane
$\theta$: Diffraction angle By controlling the crystallite size on plane (003) to be within the range above, it is possible to obtain good crystallinity, and in the non-aqueous electrolyte rechargeable battery that uses this cathode active material, it is possible to achieve excellent charge/discharge capacity and charge/discharge cycling characteristics. When the crystallite size on plane (003) is less than 80 nm, the crystallinity of the lithium composite oxide decreases, and thus the battery characteristics of the rechargeable battery that uses this cathode active material worsens. On the other hand, when the crystallite size on plane (003) is greater than 200 nm, the diffusion length of lithium ions of the lithium composite oxide particles becomes long, so the output characteristics of the rechargeable battery may decrease. In order to improve the battery characteristics, the crystallite size on plane (003) is preferably 80 nm to 150 nm, and more preferably 85 nm to 120 nm.

(4) Particle Structure

The cathode active material of the present invention includes spherical secondary particles that include aggregates of plural primary particles. The primary particles (lithium composite oxide particles) of the secondary particles can take on various shapes such as a plate shape, needle shape, rectangular shape, elliptical shape, polyhedron shape and the like. Moreover, with regard to the aggregate state, in addition to a state of aggregation that is in random directions, aggregation of particles in a radial shape from the center in the long diameter direction can also be applied to the present invention. However, in order to improve the packing density of the cathode active material that is obtained, preferably the primary particles have a spherical shape.

Furthermore, the cathode active material of the present invention has interfaces or grain boundaries between the primary particles of the secondary particles into which electrolyte can penetrate. Therefore, it is possible for electrolyte to penetrate to the surfaces of the primary particles where lithium ions are extracted or inserted, and due to a synergistic effect of controlling the integrated intensity ratio or the crystallite size on plane (003) described above, it is possible to greatly improve the input/output characteristics. Such secondary particles can be easily obtained by a crystallization process such as will be described later.

(5) Average Particle Size

The average particle size of the cathode active material of the present invention is preferably 3 μm to 20 μm. Here, the average particle size means the average particle size by volume (MV) that is found by a laser diffraction and scattering method.

When the average particle size is less than 3 μm, the packing density of the cathode active material decreases, and this may cause the battery capacity per volume of the rechargeable battery that uses this cathode active material to decrease. Moreover, excessive reaction with the electrolyte may occur, causing a decrease in safety. On the other hand, when the average particle size is greater than 20 μm, the specific surface area of the cathode active material decreases, and thus the boundary surfaces with the electrolyte decreases, so the cathode resistance may increase and output characteristics of the battery may decrease. From the aspect of obtaining excellent battery characteristics such as a high-degree of safety and high output as the battery capacity per unit volume is increased, the average particle size is more preferably 4 μm to 18 μm, and even more preferably 5 μm to 15 μm.

(6) Specific Surface Area

The specific surface area of the cathode active material of the present invention is preferably 0.3 m$^2$/g to 2.5 m$^2$/g, and more preferably 0.5 m$^2$/g to 2.0 m$^2$/g. When the specific surface area is less than 0.3 m²/g, it may not be possible to sufficiently maintain the reaction surface area with the electrolyte. On the other hand, when the specific surface area is greater than 2.5 m²/g, excessive reaction between the cathode active material and the electrolyte may occur, causing a decrease in safety. The specific surface area can be measured by a BET method using nitrogen gas adsorption.

2. Manufacturing Method for Cathode Active Material of Non-Aqueous Electrolyte Rechargeable Battery The manufacturing method for a cathode active material for a non-aqueous electrolyte rechargeable battery of the present invention includes: a crystallization process for obtaining composite hydroxide particles that include secondary particles that are formed from an aggregation of plural primary particles and that are expressed by the general formula (B), and further include Na, Mg, Ca and $SO_4$; a mixing process for obtaining a lithium mixture by mixing the composite hydroxide particles with a lithium compound; and a calcination process for obtaining lithium composite oxide particles by performing calcination of the lithium mixture. Particularly, in the present invention, by regulating the conditions in the calcination process to be within a specified range, crystal growth in the a-axis direction of the cathode active material obtained is suppressed, and the integrated intensity ratio described above is controlled to be 1.20 or greater. As a result, it becomes possible to reduce the DCIR in a low SOC state of 20% or less.

(1) Crystallization Process

The crystallization process is a process for obtaining nickel manganese composite hydroxide particles (hereafter, referred to as "composite hydroxide particles") that include secondary particles that are formed from an aggregation of plural primary particles, and are expressed by the general formula (B): $Ni_xMn_yCo_zM_t(OH)_{2+\alpha}$ (where $x+y+z+t=1$, $0.30 \leq x \leq 0.70$, $0.10 \leq y \leq 0.55$, $0 \leq z \leq 0.40$, $0 \leq t \leq 0.10$, $0 \leq \alpha \leq 0.5$, and M is at least one element that is selected from among Al, Ti, V, Cr, Zr, Nb, Mo, and W), and further includes Na, Mg, Ca and $SO_4$, with the total amount of Na, Mg and Ca included being 0.01% by mass to 0.1% by mass, and the amount of $SO_4$ included being 0.1% by mass to 1.0% by mass.

Such composite hydroxide particles can be obtained by forming a reaction aqueous solution by mixing a mixed aqueous solution, an ammonium ion donor and sodium hydroxide, controlling the pH value, the ammonium ion concentration and the fluid temperature of this reaction aqueous solution, and performing a crystallization reaction. In the present invention, this kind of crystallization reaction can be performed by using a continuous crystallization method or a batch crystallization method. Moreover, the crystallization reaction can be performed using a batch crystallization method in which a nucleation step for generating the nuclei of the composite hydroxide particles, and a particle growth step for growing the nuclei into particles are clearly separated. In such a crystallization method, it is possible to make the particle size of the obtained composite hydroxide particles more uniform.

The composite hydroxide particles that are obtained by the crystallization process are washed as necessary, and then dried to remove any moisture.

[Mixed Aqueous Solution]

The mixed aqueous solution is an aqueous solution that includes the metal components (Ni, Mn, Co, M, Na, Ca, Mg) and $SO_4$ of the composite hydroxide particles of the present invention. Of these components, Na can be supplied from the sodium hydroxide that was used for controlling the pH, so Na does not necessarily need to be included in the mixed aqueous solution as long as it is possible to obtain composite hydroxide particles having the specified composition.

a) Ni, Mn, Co and M

As the supply source for Ni and Mn, preferably sulfates of these (nickel sulfate, manganese sulfate) are used. This is not only because nickel sulfate and manganese sulfate are water soluble and can be easily dissolved in water, but $SO_4$ is included in these compounds, so it is possible to include $SO_4$ in the obtained composite hydroxide particles without having to separately add $SO_4$ to the mixed aqueous solution.

The supply source for Co is not particularly limited as long as it is possible to control the $SO_4$ in the composite hydroxide particle obtained by the supply source of Ni or Mn, or separately supplied $SO_4$ so as to be within a specified range; and it is possible to use a water soluble compound such as a nitrate or chloride. However, from the aspect of stabilizing the amount of $SO_4$ included in the composite hydroxide particles, preferably cobalt sulfate is used as the Co supply source.

The supply sources for the additional elements (M) are not limited as long as the sources are water soluble compounds; and for example, it is possible to suitably use aluminum sulfate, titanium sulfate, peroxotitanic acid ammonium, potassium titanium oxalate, vanadium sulfate, ammonium vanadate, chromium sulfate, zirconium sulfate, zirconium nitrate, oxalic acid niobium, ammonium molybdate, sodium tungstate, ammonium tungstate and the like. However, as in the case of Co, from the aspect of stabilizing the amount of $SO_4$ included in the composite hydroxide particles, preferably sulfates are used as the supply sources of the additional elements (M) as well.

In addition to adding the additional elements (M) by co-precipitation during crystallization, it is possible to add the additional elements (M) by coating the surface of the composite hydroxide particles that were obtained in the crystallization process, or impregnating the composite hydroxide particles with the additional elements (M). When doing this, when there is an insufficient amount of Na, Mg, Ca and $SO_4$ included in the composite hydroxide particles, it is possible to adjust the amount included by coating the surface of or impregnating the composite hydroxide particles with these at the same time as coating the surface of or impregnating the composite hydroxide particles with the additional elements (M).

b) Na, Mg and Ca

In order to include Na, Mg and/or Ca in the composite hydroxide particles, it is necessary to mix these components into the mixed aqueous solution.

Of these, Na, as was explained above, can be supplied from the sodium hydroxide aqueous solution that is used for controlling the pH. Moreover, Na can be supplied by using sodium salts of the additional elements (M) as compounds of the additional elements (M) that are dissolved in the mixed aqueous solution. In either case, the amount of Na supplied is preferably adjusted by taking into consideration the amount of Mg and/or Ca that is included.

On the other hand, in order to include specified amounts of Mg and/or Ca in the composite hydroxide particles, it is necessary to dissolve the specified amounts of Mg and/or Ca in the mixed aqueous solution.

The amount of Mg dissolved in the mixed aqueous solution is preferably 8 mg/L to 50 mg/L, and more preferably 10 mg/L to 40 mg/L, and even more preferably 10 mg/L to 30 mg/L. Moreover, the amount of Ca dissolved is preferably 8 mg/L to 30 mg/L, and more preferably 10 mg/L to 27 mg/L, and even more preferably 10 mg/L to 25 mg/L. When both the amount of Mg and Ca dissolved is less than the lower limit value, the total amount of Na, Mg and Ca included in the composite hydroxide particles may become less than the specified value. On the other hand, when the amount include of one of Mg or Ca is greater than the upper limit value, the total amount of Na, Mg and Ca included in the composite hydroxide particles may become greater than the specified value. Mg and Ca may be mixed into mixed aqueous solution as impurities, so the amount included is preferably adjusted taking into consideration the amount of Mg and Ca mixed in as impurities.

The sources for supplying Mg and Ca are not particularly limited, however, taking into consideration the ease of handling, preferably water-soluble compounds such as calcium sulfate and magnesium sulfate are used.

c) $SO_4$

In order to include $SO_4$ in the composite hydroxide particles, it is necessary for there to be $SO_4$ in the mixed aqueous solution. In order to supply this kind of $SO_4$, preferably, as described above, sulfates are used as metal salts that are dissolved in the mixed aqueous solution. By using sulfates, it is possible to easily obtain composite hydroxide particles that include a specified amount of $SO_4$ without having to separately add $SO_4$.

d) Concentration of Mixed Aqueous Solution

The concentration of the metal compounds in the mixed aqueous solution, or in other words, the total concentration of the Ni, Mn, Co and M compounds, and the Mg and/or Ca compounds is preferably controlled to be 1 mol/L to 2.4 mol/L, and more preferably controlled to be 1.5 mol/L to 2.2 mol/L. As a result, it is possible to properly control the amount of Mg and/or Ca included in the composite hydroxide particles. When the concentration of the metal compounds is less than 1 mol/L, the amount of crystals per reaction tank decreases, so productivity decreases. On the other hand, when the concentration is greater than 2.4 mol/L, the concentration is greater than the saturated concentration at normal temperature, so there is a possibility that crystals will recrystallize and become clogged in the equipment piping.

It is not absolutely necessary to supply each of the metal compounds to the reaction tank as mixed aqueous solution. For example, when using a metal compound that is generated by mixing and reacting, it is possible to separately prepare aqueous solutions in which specified amounts of metal compounds are dissolved, and to supply those aqueous solutions to the reaction tank at the same time so that the total concentration of the metal compounds included in those aqueous solutions is adjusted to be within the range above.

[Ammonia Concentration]

In the crystallization process, an ammonium-ion donor is supplied to the reaction aqueous solution, and the ammonia concentration of that ammonium-ion donor is preferably adjusted to be within the range of 3 g/L to 20 g/L, and more preferably 5 g/L to 15 g/L.

Ammonia is used in the reaction aqueous solution as a complexing agent, so when the ammonia concentration is less than 3 g/L, it is not possible to keep the solubility of metal ions constant, and composite hydroxide particles may be formed that do not have a uniform shape and size. On the other hand, when the ammonia concentration is greater than 20 g/L, the solubility of metal ions becomes too large, and the amount of metal ions remaining in the reaction aqueous solution increases, so a shift in the composition may occur, and there is a possibility that crystal growth will be promoted and that the crystallite size of the cathode active material that is finally obtained will be too large.

When fluctuation of the ammonia concentration throughout the crystallization process is large, there will be a large fluctuation in the solubility of metal ions, which will cause the particle size distribution of the composite hydroxide particles to worsen and the cause the composition to shift. Therefore, fluctuation of the ammonia concentration throughout the crystallization process must be suppressed preferably to be within ±2.5 g/L of the set value, and more preferably to be within ±1.5 g/L of the set value.

The ammonia-ion donor is not particularly limited, and for example, it is possible to use ammonia, ammonium sulfate, ammonium chloride, ammonium carbonate, ammonium fluoride and the like. Of these, from the aspect of ease of handling, it is possible to suitably use an ammonia aqueous solution, and especially 25% by mass ammonia water.

[pH Control]

In the crystallization process, it is necessary to control the pH value to be within a specified range by supplying sodium hydroxide to the reaction aqueous solution.

More specifically, in the crystallization process, the pH value of the reaction aqueous solution is controlled to be within the range of 10.5 to 12.0 at a standard liquid temperature of 25° C., and preferably 11.0 to 12.0 and more preferably 11.3 to 12.0. As long as the pH value of the reaction aqueous solution is within such a range, it is possible to easily control the amounts of Na and $SO_4$ included in the composite hydroxide particles to be within a specified range. Moreover, it becomes possible to control the average particle size and particle size distribution of the composite hydroxide particles to be within suitable ranges. Therefore, it is possible to control the amounts of Na and $SO_4$ included in the cathode active material having these composite hydroxide particles as a precursor, as well as the average particle size and particle size distribution to being within suitable ranges.

On the other hand, when the pH value is less than 10.5, the amount of Na included in the composite hydroxide particles is not sufficient, and there is a surplus amount of $SO_4$ included, so it is not possible to obtain a cathode active material having the composition described above. Moreover, the solubility becomes too high, so the amount of metal ions remaining in the reaction aqueous solution that have not crystallized increases, and thus productivity worsens. Furthermore, both nucleation and crystal growth proceed at the same time, so the particle size distribution of composite hydroxide particles becomes larger. On the other hand, when the pH value is greater than 12.0, there is a surplus amount of Na included in the composite hydroxide particles, and the amount of $SO_4$ included is insufficient, so similarly it is not possible to obtain a cathode active material having the composition described above. Moreover, the amount of nuclei generated increases and the composite hydroxide particles become fine, so the cathode active material that is obtained also becomes fine. Furthermore, there is a possibility that the reaction aqueous solution will become gel like.

When the crystallization reaction is performed by using a batch crystallization method in which the nucleation step and crystal growth step are clearly separate as described above, the pH value in the nucleation step is made to be 12.0 to 14.0 at a standard liquid temperature of 25° C., and the pH value in the particle growth step is made to be lower than in the nucleation step at a standard liquid temperature of 25° C., and is preferably 10.5 to 12.0. As a result, it is possible to make the particle size distribution of the obtained composite hydroxide particles narrower.

When the fluctuation of the pH value in the crystallization process is large, nucleation and crystal growth will proceed at the same time, and it becomes easy for the particle size distribution of the composite hydroxide particles that are obtained to become worse. Therefore, fluctuation of the pH value is preferably controlled to be within ±0.2 of the set value, and more preferably controlled to be within ±0.15 of the set value.

[Temperature of Reaction Aqueous Solution]

The temperature of the reaction aqueous solution is adjusted be 35° C. or greater, and preferably 35° C. to 60° C. When the reaction aqueous solution is less than 35° C., the solubility becomes extremely low and the generation of nuclei becomes excessive and difficult to suppress. The upper limit of the temperature of the reaction aqueous solution is not particularly limited, however, when the temperature is greater than 60° C., the volatilization of ammonia is promoted, and so a surplus of an ammonium-ion donor must be supplied in order to keep the ammonia concentration within the specified range, which leads to an increase in production cost.

(2) Washing Process

The washing process is a process for washing the composite hydroxide particles that are obtained in the crystallization process, and removing Na, Mg, Ca and $SO_4$ that remains excessively on the surface. The amounts of Na, Mg, Ca and $SO_4$ that remain after washing do not change much after calcination, so by performing the washing process, it is possible to adjust the amounts of Na, Mg, Ca and $SO_4$ included in the cathode active material obtained to be within a suitable range.

The washing process is not particularly limited, and it is possible to perform the washing process using a typical method and conditions. However, preferably, the cathode active material is produced in advance, and after confirming the amounts of Na, Mg, Ca and $SO_4$ that are included in that cathode active material, the washing method and washing conditions are set. As a result, it is possible to control the amount of the components included in the cathode active material to be within a more suitable range. Rather than performing washing one time, preferably washing is performed plural times, and more preferably is performed two to five times. By performing washing plural times, it is possible to more effectively remove the Na, Mg, Ca and $SO_4$ that remain excessively, so controlling the included amounts of these to be within a desired range becomes simple.

On the other hand, when the amounts of Na, Mg, Ca and $SO_4$ that are included in the composite hydroxide particles after the washing process are not sufficient, it is possible to adjust the amounts that these components are included by coating or impregnating the composite hydroxide particles with these components as described above. Alternatively, it is possible to adjust the amounts included of these components by using wash water in the washing process to which these components have been added.

For example, in the case of the latter, an aqueous solution that preferably includes the necessary components of the Na, Mg, Ca or $SO_4$ in a range of 2 mg/L to 50 mg/L, and more preferably 5 mg/L to 30 mg/L is used as wash water, and the washing process is performed using a batch type mixer or washing in running water. No matter what washing method is used, washing is preferably performed by checking which components are lacking and the amount of those components, and then adjusting the conditions so that the amount included of each component is within a suitable range.

(3) Heat-Treatment Process

In the manufacturing method of the present invention, it is possible to arbitrarily perform heat treatment of the composite hydroxide particles after the crystallization process and before the mixing process, and then mix in the lithium compound with the heat-treated particles. Here, the heat-treated particles could include not only composite hydroxide particles from which surplus moisture was removed in the heat-treatment process, but could also include nickel manganese composite oxide particles (hereafter, referred to as "composite oxide particles") that were transformed to oxide particles in the heat-treatment process, or could include a mixture of these.

The heat-treatment process is a process for removing moisture that is included in the composite hydroxide particles by heating and processing the composite hydroxide particles at 105° C. to 700° C. As a result, it is possible to reduce the moisture remaining in the particles up to the calcination process to a fixed amount, so it is possible to prevent variation in the percentage of the number of atoms of each of the metal components in the obtained cathode active material, or the number of Li atoms, and to stabilize the ratio of the number of Li atoms (Li/Me).

In the heat-treatment process, moisture is removed by just an amount so that variation in the percentage of the number of atoms of metal components in the cathode active material or the number of Li atoms does not occur, so it is not absolutely necessary to transform all of the composite hydroxide particles to composite oxide particles. However, in order to further reduce the variation in the percentage of the number of atoms of metal element components or the number of Li atoms, preferably heating is performed at the decomposition condition or greater of the nickel manganese hydroxide, and all of the composite hydroxide particles are transformed to composite oxide particles.

The heating temperature in the heat-treatment process is 105° C. to 700° C., and preferably 110° C. to 400° C. When the heating temperature is less than 105° C., it may not be possible to remove the surplus moisture from the composite hydroxide particles, and to sufficiently suppress variation. On the other hand, when the heating temperature is greater than 700° C., not only can no more effect be expected, but the production cost increases. When the heating temperature is 200° C. or less, it is possible to perform the heat-treatment process together with the drying process after the crystallization process or washing process.

The atmosphere in the heat-treatment process is not particularly limited as long as the atmosphere is a non-reducing atmosphere, and preferably heat treatment is performed in a simple flow of air.

The heat-treatment time is also not particularly limited, however when the time is less than 1 hour, it may not be possible to sufficiently remove the surplus moisture from the composite hydroxide particles. Therefore, preferably the time is at least 1 hour or more, and more preferably 5 hours to 15 hours.

The equipment that is used in this kind of heat-treatment process is not particularly limited, and as long as it is possible to heat the composite hydroxide particles in a non-reducing atmosphere and preferably in a flow of air, an electric furnace that does not generate gas can be suitably used.

(4) Mixing Process

The mixing process is a process for obtaining a lithium mixture by mixing in a lithium compound so that the ratio (Li/Me) of the number of atoms of Li with respect to the total number of atoms (Me) of the Ni, Mn, Co and additional elements (M) of the composite hydroxide particles or heat-treated particles is 1.00 to 1.20, and preferably 1.00 to 1.15. In other words, the ratio Li/Me does not change before or after the calcination process, so the composite hydroxide particles or heat-treated particles and the lithium compound must be mixed so that the ratio Li/Me of the lithium mixture that is obtained in this mixing process becomes the ratio Li/Me of the target cathode active material.

The lithium compound that is mixed with the composite hydroxide particles or heat-treated particles is not particularly limited, however, taking into consideration the ease of procurement, it is possible to suitably uses lithium hydroxide, lithium sulfate, lithium carbonate or a mixture of these. Particularly, when considering the ease of handling and stability of product quality, preferably lithium hydroxide or lithium carbonate is used, and more preferably lithium carbonate is used.

The lithium mixture is preferably mixed sufficiently before calcination. When the lithium mixture is not sufficiently mixed, variation in the Li/Me ratio among individual particles may occur, and it may not be possible to obtain sufficient battery characteristics.

For mixing, it is possible to use a typical mixer, for example, it is possible to use a shaker mixer, a V blender, a ribbon mixer, a Julia mixer, a Loedige mixer and the like. No matter which mixer is used, the lithium compound should be sufficiently mixed with the composite hydroxide particles or heat-treated particles to an extent that the shapes of the composite hydroxide particles or heat-treated particle are not damaged.

In the mixing process, it is also possible to mix in compounds of additional elements (M) together with the lithium compound. Alternatively, it is possible to mix in the lithium compound after the surface of the composite hydroxide particles or composite oxide particles have been coated with the additional elements (M) as described above. Furthermore, it is possible to use both of these methods together. No matter which method is used, the additional elements (M) must be appropriately adjusted so that composition becomes that of general formula (A).

(5) Pre-calcination Process

When lithium hydroxide or lithium carbonate is used as the lithium compound, pre-calcination is performed after the mixing process and before the calcination process, at a temperature (pre-calcination temperature) that is lower than the calcination temperature, and that is within the range of 350° C. to 800° C., and preferably 450° C. to 700° C. In other words, preferably pre-calcination is performed at or near the reaction temperature of the lithium hydroxide or lithium carbonate and the composite hydroxide particles or composite oxide particles. As a result, dispersion of lithium into the heat-treated particles is promoted, and it is possible to obtain more uniform lithium composite oxide particles.

When doing this, the temperature is preferably maintained at the pre-calcination temperature for 1 hour to 10 hours, and more preferably for 3 hours to 6 hours.

Moreover, except for in the maintained state, the average rate of temperature rise from room temperature to 650° C. is preferably 3° C./min to 10° C./min, and more preferably 5° C./min to 8° C./min. As a result, it is possible to make the crystal structure of the cathode active material even more uniform.

In the present invention, by slowing the rate of temperature rise from room temperature to 650° C. in the calcination process, it is possible to practically obtain the same effect as in the case of performing a pre-calcination process.

(6) Calcination Process

The calcination process is a process for obtaining lithium composite oxide particles by performing calcination under specified conditions of the lithium mixture that was obtained in the mixing process, and then cooling to room temperature.

Layered hexagonal crystal lithium composite oxide particles have different rates of growth for each crystal orientation depending on conditions in the formation process. More specifically, when the thermal energy applied is small, growth in the c-axis direction becomes dominant, however, as the thermal energy becomes larger, growth in the a-axis direction that is orthogonal to the c-axis becomes dominant. When this happens, the crystal growth is determined according to the amount of time that the lithium composite oxide particles receive the applied thermal energy. Here, the thermal energy is proportional to the temperature, however, the crystal growth, from a kinetic point of view, is thought to be proportional to the square root of the time.

On the other hand, in the formation process of lithium composite oxide particles, as the temperature of the lithium mixture rises, first, the composite hydroxide particles or composite oxide particles react with the lithium compound, and lithium composite oxide particles having low crystallinity are formed. After that, when the temperature becomes 650° C. or greater, crystal growth proceeds and lithium composite oxide particles having aligned crystallinity are formed. Therefore, in order to obtain lithium composite oxide particles having high crystallinity, controlling the thermal energy that is applied in the temperature range of 650° C. or greater, and the amount of time that thermal energy is applied is considered to be important.

Based on these studies and as a result of diligent research, the inventors learned that in the process of raising the temperature from 650° C. to the calcination temperature, and in the process of maintaining the temperature at the calcination temperature, by managing the product of the temperature (T) and square root of time (t) ($T \cdot t^{1/2}$) as an evaluation index (crystal growth index: G), it is possible to control the crystal growth in all temperature ranges, and obtain lithium composite oxide particles having the crystal structure specified above. Based on this knowledge, the conditions of the calcination process of the present invention were derived from the aspect of efficiently obtaining cathode active material having this kind of crystal structure in an industrial production process.

The calcination furnace that can be used in the calcination process of the present invention is not limited as long as it is possible to control the conditions below; however, a furnace that is capable of heating in an air to oxygen atmosphere is preferred. Particularly, using an electric furnace that does not generate gas is preferred, and it is possible to suitably use either a batch-type electric furnace or continuous-type electric furnace.

[Calcination Temperature]

The calcination temperature ($T_{cal}$) in the calcination process is 850° C. to 1000° C., and preferably 850° C. to 980° C., and more preferably 850° C. to 950° C. When $T_{cal}$ is less than 850° C., Li is not sufficiently dispersed into the composite hydroxide particles or composite oxide particles, so surplus Li and unreacted composite hydroxide particles or composite oxide particles remain, and crystallinity becomes low. On the other hand, when $T_{cal}$ is greater than 1000° C., extreme sintering occurs among the generated lithium composite oxide particles, which leads to abnormal particle growth, so the particles become coarse and it is not possible to maintain the spherical shape of the secondary particles. Furthermore, when calcination is performed with any one of the conditions being outside the temperature range of the present invention, not only does the battery capacity decrease, but the value of the reaction resistance of the cathode also becomes high.

[Crystal Growth Index]

In the calcination process of the present invention, the calcination temperature ($T_{cal}$) is regulated to the range above, and by using individual indices to manage the crystal growth in the temperature range from 650° C. to $T_{cal}$ in which the formation (crystallization) of the lithium composite oxide and crystal growth of the crystallized lithium composite oxide proceed simultaneously, and crystal growth at $T_{cal}$ when there is only crystal growth of lithium composite oxide, crystal growth is strictly controlled.

More specifically, calcination is performed by controlling $T_{cal}$ to be within the range described above, and controlling a crystal growth index ($G_1$) that is defined by the average temperature ($T_{ave1}$) during the rise in temperature from 650° C. to $T_{cal}$, and the amount of time (t1) of this temperature rise according to Equation (a) below so as to be 550° C.·h$^{1/2}$ to 1000° C.·h$^{1/2}$, and controlling a crystallization index ($G_2$) that is defined by the average temperature ($T_{ave2}$) during the time that the temperature is maintained at $T_{cal}$, and the amount of time ($t_2$) during this maintenance time according to Equation (b) below so as to be 1500° C.·h$^{1/2}$ to 3500° C.·h$^{1/2}$. In the present invention, the average temperatures $T_{ave1}$ and $T_{ave2}$ can be found by dividing the integral values of the change over time of each temperature range by the time ($t_1$, $t_2$) for each range.

Crystal growth index: $G_1 = T_{ave1} \times t_1^{1/2}$ (a)

Crystal growth index: $G_2 = T_{ave2} \times t_2^{1/2}$ (b)

In this kind of invention, in the calcination process, it is possible to increase the crystallinity while suppressing crystal growth in the a-axis direction that is orthogonal to the c-axis direction, so the integrated intensity ratio can be controlled to be 1.20 or greater.

In regard to this, when $G_1$ is less than 550° C.·h$^{1/2}$, it is not possible for the lithium ions to sufficiently disperse into the composite hydroxide particles or composite oxide particles, so problems occur in that surplus Li and unreacted composite hydroxide particles or composite oxide particles remain, and the reaction between the lithium compound and the composite hydroxide particles or composite oxide particles is not uniform. On the other hand, when $G_1$ is greater than 1000° C.·h$^{1/2}$, the temperature stops for a long time in the temperature range in which crystal growth is possible, so crystal growth proceeds in the a-axis direction, and the DCIR of the lithium-ion rechargeable battery that uses the obtained cathode active material becomes high. In order to be able to further reduce the DCIR and further increase the capacity, preferably $G_1$ is controlled to be 580° C.·h$^{1/2}$ to 950° C.·h$^{1/2}$, and more preferably is controlled to be 600° C.·h$^{1/2}$ to 900° C.·h$^{1/2}$.

Moreover, when $G_2$ is less than 1500° C.·h$^{1/2}$, the crystal structure is not sufficiently aligned, so lithium composite oxide particles having low crystallinity are generated. On the other hand, when $G_2$ is greater than 3500° C.·h$^{1/2}$, crystal growth in the a-axis direction proceeds, and the DCIR of the lithium-ion rechargeable battery that uses the obtained cathode active material becomes high. In order to be able to further reduce the DCIR and further increase the capacity, preferably $G_2$ is controlled to be 2000° C.·h$^{1/2}$ to 3300° C.·h$^{1/2}$.

[Calcination Pattern]

Figure 2:
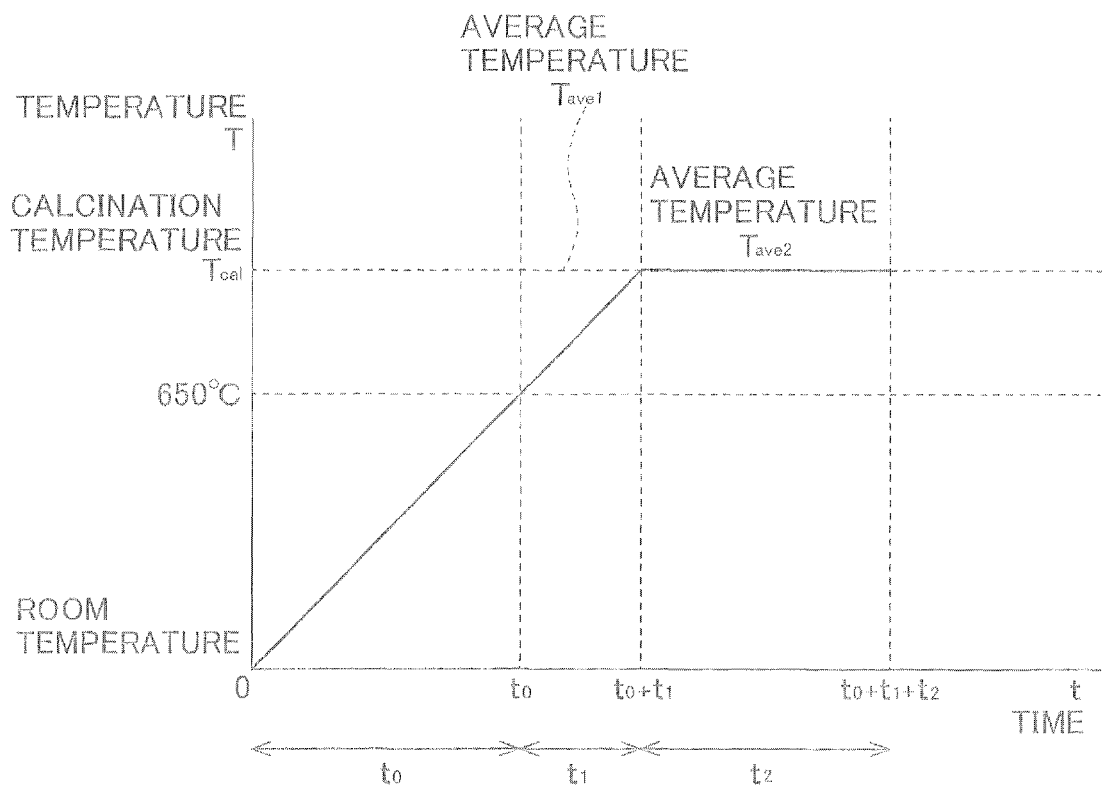
FIG. 2 illustrates an example of a calcination pattern in a calcination process.

FIG. 2 illustrates a basic calcination pattern of the calcination process of the present invention. In the present invention, as long as the calcination temperature ($T_{cal}$) and the crystal growth indices ($G_1$, $G_2$) are within the ranges described above, the calcination pattern is not limited. However, in order to efficiently obtain cathode active material having the crystal structure specified above in production on an industrial scale, preferably the conditions in each step of the calcination process are controlled as explained below.

a) Room Temperature (30° C.) to 650° C.

In the temperature range from room temperature (30° C.) to 650° C., the composite hydroxide particles or composite oxide particles react with the lithium compound, and lithium composite oxide having low crystallinity is formed.

The calcination conditions in this step are not particularly limited, however, preferably the amount of time ($t_0$) of the temperature rise is 0.8 hours to 10 hours, and more preferably 1.0 hour to 8.0 hours. In other words, the average rate of temperature rise during this time ($V_{ave0} = 620/(t_0 \times 60)$) is preferably 1.0° C./min to 12.9° C./min, and more preferably 1.29° C./min to 10.3° C./min. When to is less than 0.8 hours, there is a possibility that the reaction between the composite hydroxide particles or the composite oxide particles and the lithium compound will not proceed sufficiently. On the other hand, when to is greater than 10 hours, productivity worsens.

b) 650° C. To the Calcination Temperature

In the temperature range from 650° C. to the calcination temperature, formation (crystallization) of lithium composite oxide proceeds at the same time as the crystal growth of the lithium composite oxide. Therefore, in this step, the calcination conditions must be appropriately controlled, and the crystal growth index ($G_1$) must be controlled to be within the range above.

The average temperature ($T_{ave1}$) in this temperature range is preferably controlled to be 700° C. to 850° C., and more preferably 750° C. to 800° C. When $T_{ave1}$ is within a range such as this, it is possible to make that crystal structure of the obtained cathode active material uniform. When $T_{ave1}$ is less than 700° C., it is possible that the reaction between the lithium compound and the composite hydroxide particles or composite oxide particles will be not be uniform. On the other hand, when $T_{ave1}$ is greater than 850° C., there is a possibility that excessive crystal growth will proceed in the a-axis direction.

The amount of time ($t_1$) of the temperature rise in this temperature range is preferably 0.5 hours to 1.8 hours, and more preferably 0.5 hours to 1.5 hours, and even more preferably 0.6 hours to 1.2 hours. By controlling $t_1$ in this way, it is possible to further suppress crystal growth in the a-axis direction, and it becomes possible to easily control the integrated intensity ratio to be within the range described above. When $t_1$ is less than 0.5 hours, it becomes difficult to make the reaction between the composite hydroxide particles or composite oxide particles and the lithium compound uniform. On the other hand, when $t_1$ is greater than 1.8 hours particle growth proceeds too much, and sintering occurs too much among particles, which may cause the cathode resistance of the obtained rechargeable battery to become high.

Moreover, as long as the crystal growth index $G_1$ is controlled to be within the range described above, the maximum rate of temperature rise ($V_{max1}$) in this temperature range is not particularly limited, however is preferably controlled to be 15° C./min or less, and more preferably is controlled to be 10° C./min or less. As a result, it is possible to cause the Li to sufficiently disperse into the composite hydroxide particles or composite oxide particles, and to obtain uniform lithium composite oxide particles. On the other hand, when $V_{max1}$ is greater than 15° C./min, Li is not sufficiently dispersed, and the crystal structure of the obtained cathode active material made not become uniform.

Furthermore, the average rate of temperature rise ($V_{ave1} = (T_{cal} - 650°$ C.$)/(t_1 \times 60)$) in this temperature range is preferably controlled to be 3° C./min to 10° C./min, and more preferably is controlled to be 5° C./min to 7° C./min. When $V_{ave1}$ is less than 3° C./min, crystal growth in the a-axis direction may proceed excessively. On the other hand, when $V_{ave1}$ is greater than 10° C./min, the reaction between the composite hydroxide particles or the composite oxide particles and the lithium compound may not be uniform.

The rate of temperature rise in this temperature range does not absolutely have to be fixed, and it is possible to change the rate of temperature rise in steps or continuously. However, in order to simplify temperature control, preferably the rate of temperature rise is fixed.

c) Calcination Temperature

In the temperature range of the calcination temperature ($T_{cal}$), mainly crystal growth of lithium composite oxide proceeds, and lithium composite oxide having high crystallinity is formed.

As long as $T_{cal}$ is within the range described above, Teat does not absolutely need to be fixed, and it is possible to change $T_{cal}$ in steps and maintain $T_{cal}$ at plural temperatures. Alternatively, Teat can be raised or lowered at a rate of preferably 5° C./min or less, and more preferably 2° C./min or less. However, from the aspect of making the crystal structure of the obtained cathode active material more uniform, preferably the average temperature ($T_{ave1}$) during this time is controlled to be 850° C. to 980° C., and more preferably is controlled to be 850° C. to 950° C.

Moreover, the amount of time ($t_2$) during which the temperature is maintained at the calcination temperature is preferably 4 hours to 15 hours, and more preferably 5 hours to 13 hours, and even more preferably 5 hours to 12 hours. When $t_2$ is less than 4 hours, the crystal structure of the cathode active material may not become uniform, and the crystallinity may decrease. On the other hand, when $t_2$ is greater than 15 hours, crystal growth proceeds in the a-axis direction that is orthogonal to the c-axis, so it becomes difficult to control the integrated intensity ratio to be within the prescribed range.

d) Overall Calcination Time

In the calcination process, the amount of time from when the temperature rises and has reached 650° C. to the end of calcination, or in other words, the amount of tine from when the temperature inside the calcination furnace has reached 650° C. until the end of maintaining the temperature at the calcination temperature ($T_{cal}$) (hereafter, this is referred to as the "overall calcination time ($t_3 = t_1 + t_2$)" is an amount of time that has a large effect on the crystal growth of the lithium composite oxide. The time $t_3$ is preferably controlled to be 5 hours to 15 hours, and more preferably 6 hours to 15 hours, and even more preferably 7 hours to 15 hours. When $t_3$ is less than 5 hours, the composite hydroxide particles or composite oxide particles do not sufficiently react with the lithium compound, and excess Li and unreacted composite hydroxide particles or composite oxide particles may remain, and the crystallinity of the obtained lithium composite oxide may decrease. On the other hand, when $t_3$ is greater than 15 hours, crystal growth in the a-axis direction may proceed.

[Calcination Atmosphere]

The atmosphere during calcination is an oxidizing atmosphere, and is preferably an atmosphere having an oxygen concentration of 18% by volume to 100% by volume, or in other words, calcination is preferably performed in a flow of air to oxygen. Taking cost into consideration, performing calcination in a flow of air is particularly preferred. When the oxygen concentration is less than 18% by volume, the oxidation reaction may not proceed sufficiently, and the crystallinity of the obtained lithium composite particles may not be sufficient.

(7) Crushing Process

In the manufacturing method of the present invention, there is preferably a crushing process after the calcination process for crushing the lithium composite oxide particles. The lithium composite oxide particles that were obtained in the calcination process may be aggregated or lightly sintered together. In such a case, by crushing the aggregates or sintered bodies of lithium composite oxide particles, it is possible to adjust the average particle size (MV) of the obtained cathode active material to be within the suitable range of 3 μm to 20 μm. Crushing is an operation of breaking up aggregates by applying mechanical energy to aggregates of plural secondary particles that occurred due to sintered necking and the like during calcination, and separating the secondary particles with hardly any damage to the particles.

It is possible to use a known method as the crushing method; for example, it is possible to use a pin mill, a hammer mill and the like. When performing crushing, preferably the crushing force is adjusted to be within a suitable range so that the secondary particles are not damaged.

3. Non-aqueous Electrolyte Rechargeable Battery

The non-aqueous electrolyte rechargeable battery of the present invention has components that are similar to a typical non-aqueous electrolyte rechargeable battery such as a cathode, an anode, a separator, a non-aqueous electrolyte and the like. The form explained below is only an example, and the non-aqueous electrolyte rechargeable battery of the present invention can undergo various modifications or improvements based on the form disclosed in this specification.

(1) Component Materials

[Cathode]

The cathode of the non-aqueous electrolyte rechargeable battery is made as described below, for example, using the cathode active material for a non-aqueous electrolyte rechargeable battery that was obtained according to the present invention.

First, an electrically conductive material and a binding agent are mixed with the powder cathode active material that was obtained according to the present invention; then as necessary, active carbon or solvent for adjusting viscosity is added, and these are all mixed to produce a cathode paste. When doing this, the ratios of components in the cathode paste are important elements for setting the performance of the non-aqueous electrolyte rechargeable battery. When the solid component of the cathode paste that does not include the solvent is taken to be 100 parts by mass, then, preferably, as in the case of a cathode of a typical non-aqueous electrolyte rechargeable battery, the content of cathode active material is taken to be 60 parts by mass to 95 parts by mass, the content of the electrically conductive material is taken to be 1 part by mass to 20 parts by mass, and the content of the binding agent is taken to be 1 part by mass to 20 parts by mass.

The obtained cathode paste is applied to the surface of an aluminum foil current collector, and then dried to evaporate the solvent. As necessary, in order to increase the electrode density, pressure may be applied using a roll press. In this way, it is possible to produce a sheet-type cathode. A sheet-type cathode can be cut to an appropriate size to correspond to the target battery, and provided for producing a battery. However, the method for producing a cathode is not limited to the example described above, and other methods can also be used.

As the electrically conductive material, it is possible to use, for example, graphite (natural graphite, artificial graphite, expanded graphite and the like), or carbon black such as acetylene black or Ketjen black.

The binding agent performs the role of binding together active material particles, and, for example, it is possible to use polyvinylidene fluoride (PVDF), polytetrafluoroethylene (PTFE), fluororubber, ethylene propylene diene rubber, styrene-butadiene, cellulose resin, and polyacrylic acid.

Moreover, as necessary, it is possible to add a solvent to the cathode material to disperse the cathode active material, electrically conductive material and active carbon, and to dissolve the binding agent. As the solvent it is possible to use an organic solvent such as N-methyl-2-pyrrolidone. It is also possible to add active carbon to the cathode material for increasing the electric double-layer capacitance.

[Anode]

An anode that is formed by mixing a binding agent with metallic lithium or lithium alloy, or anode active material that can store or release lithium ions and adding a suitable solvent to form a paste-like anode material, then applying that anode material to the surface of a metal foil, for example, copper foil current collector, drying the material, and pressing as necessary to increase the electrode density is used as the anode.

As the anode active material, it is possible to use, for example, a powdered carbon material such as an organic composite sintered body like natural graphite, artificial graphite and phenol resin, and coke. In this case, as in the case of the cathode, it is possible to use a fluorine-containing resin such as PVDF as the anode binding agent, and as the solvent for dispersing the active material and binding agent, an organic solvent such as N-methyl-2-pyrrolidone can be used.

[Separator]

A separator is arranged so as to be held between the cathode and the anode. The separator separates the cathode and the anode and supports an electrolyte; and for the separator is it possible to use a thin film of polyethylene, polypropylene or the like, that has many small minute holes.

[Non-aqueous Electrolyte]

The non-aqueous electrolyte is an electrolyte in which lithium salt as a supporting electrolyte is dissolved in an organic solvent.

As the organic solvent, it is possible to use one kind or a combination of two kinds or more selected from among a cyclic carbonate such as ethylene carbonate, propylene carbonate, butylene carbonate, trifluoro propylene carbonate and the like; a chain carbonate such as diethyl carbonate, dimethyl carbonate, ethyl methyl carbonate, dipropyl carbonate and the like; an ether compound such as tetrahydrofuran, 2-methyltetrahydrofuran, dimethoxyethane and the like; a sulfur compound such as ethyl methyl sulfone, butane sulfone and the like; and a phosphorus compound such as triethyl phosphate, trioctyl phosphate and the like.

As the supporting electrolyte, it is possible to use $LiPF_6$, $LiBF_4$, $LiClO_4$, $LiAsF_6$, $LiN(CF_3SO_2)_2$, a composite salt of these and the like.

Furthermore, the non-aqueous electrolyte can also include a radical scavenger, a surfactant, flame retardant and the like.

(2) Shape and Construction of a Rechargeable Battery

The non-aqueous electrolyte rechargeable battery of the present invention that includes a cathode, an anode, a separator and a non-aqueous electrolyte as described above can have various shapes such as a cylindrical shape, a layered shape and the like. No matter what shape is used, the cathode and anode are layered with a separator in between to form an electrode body, and the electrolyte is impregnated into the obtained electrode body, collector leads are used to connect between the cathode current collector and a cathode terminal that runs to the outside, and between the anode current collector and an anode terminal that runs to the outside, and the components are then sealed in a battery case to complete the non-aqueous electrolyte rechargeable battery.

(Characteristics)

For the non-aqueous electrolyte rechargeable battery that uses the cathode active material of the present invention, it is possible to improve the input/output characteristics, and particularly to greatly suppress the DCIR in a low SOC state. For example, when a 2032 type coin battery such as illustrated in FIG. 1 is made using the cathode active material of the present invention, it is possible to suppress the DCIR to 100 mΩ or less, and preferably 98 mΩ or less even in a low SOC state of 20% or less.

Moreover, with the present invention, by including specified amounts of Na, Mg and Ca in the cathode active material, it is possible for a non-aqueous electrolyte rechargeable battery that uses this cathode active material to improve the capacity retention during charge/discharge cycling of the battery without greatly reducing the initial discharge capacity. For example, when a 2032 type coin battery is similarly made, it is possible to make the initial discharge capacity 152 mAh/g or more, and preferably 155 mAh/g or more, and even more preferably 157 mAh/g or more. Moreover, it is possible for the capacity retention when repeating 25 charge/discharge cycles of this 2032 type coin battery to be 90% or more, and preferably 91.0% or more, and even more preferably 91.5% or more.

Furthermore, the non-aqueous electrolyte rechargeable battery of the present invention can be said to have excellent thermal stability and safety even when compared with a conventional rechargeable battery that uses a lithium cobalt composite oxide, or a lithium nickel composite oxide. Therefore, it is possible to simplify the expensive protective circuitry, and to lower the cost of the rechargeable battery.

(4) Uses

A non-aqueous electrolyte rechargeable battery having the characteristics described above can be suitably used as the power source for compact electronic devices or transport machinery such as electric automobiles in which installation space is limited and for which high output characteristics are required even when used in cold regions. The present invention can be used not only as the power source for an electric automobile that is driven simply by electric energy, but also can be used as the power source of a so-called hybrid vehicle in which the battery is used together with a combustion engine such as a gasoline engine or diesel engine.

EXAMPLES

In the following, the present invention will be described in detail by referencing some examples and comparative examples. In all of the examples and comparative examples, unless specified otherwise, specimens using special high-grade chemicals manufactured by Wako Pure Chemicals Industry, Ltd. were used for making the composite hydroxide particles, cathode active material, and rechargeable battery.

Example 1

[Crystallization Process]

First, water was put into a reaction tank (5 L) while stirring, and after adjusting the temperature inside the tank to 45° C., 25% by mass ammonia aqueous solution and 24% by mass sodium hydroxide aqueous solution were added and adjusted so that the ammonia concentration inside the tank was 10 g/L, and the pH value at a standard liquid temperature of 25° C. was 11.6.

Next, a mixed aqueous solution in which sulfates of Ni, Mn, Co, Mg and Ca were dissolved, and an aqueous solution in which sodium tungstate ($Na_2WO_4$) was dissolved were prepared. Of these, the mixed aqueous solution was adjusted so that the concentration of metal compounds (sulfates of Ni, Mn, Co, Mg and Ca) was 2 inn, Ni, Mn and Co were included at a mol ratio of Ni:Mn:Co=1:1:1, the amount of Mg included was 30 g/L and the amount of Ca included was 20 mg/L.

The aqueous solutions were supplied to the reaction tank so that the mol ratio became (Ni+Mn+Co):W=0.995:0.005.

After that, the 25% by mass ammonia solution and 24% by mass sodium hydroxide solution were supplied so that the ammonia concentration in the reaction tank was maintained at 10 g/L and the pH value was maintained at 11.6, and composite hydroxide particles were crystallized while recovering the over flowing slurry.

[Washing Process, Heat-Treatment Process]

The recovery slurry was separated into solid and liquid, then washed with pure water and filtered three times, and dried at 120° C. in an air atmosphere to obtain composite hydroxide particles. The composite hydroxide particles were analyzed using an ICP atomic emission spectrometry device (ICPS-8100 manufactured by Shimadzu Corporation), and it was confirmed that the composite hydroxide particles were expressed by the general formula: $Ni_{0.332}Co_{0.331}Mn_{0.332}W_{0.005}O_{2+\alpha}$ (where $0 \leq \alpha \leq 0.5$), the amount of $SO_4$ included was 0.57% by mass, and the total amount of Na, Mg and Ca included was 0.069% by mass.

[Mixing Process]

Lithium carbonate was added to the obtained composite hydroxide particles so that Li/Me=1.10, then mixed using a shaker mixer (TURBULA Type T2C, manufactured by Willy A. Bachofen (WAB) AG) to obtain a lithium mixture.

[Calcination Process, Crushing Process]

Calcination of the lithium mixture was performed using the calcination pattern illustrated in FIG. 2 in an air atmosphere (oxygen: 21% by mass). More specifically, with a calcination temperature ($T_{cal}$) of 900° C., the temperature was raised from room temperature (30° C.) to the temperature range of $T_{cal}$ over 2.4 hours at a rate of temperature rise ($V_{ave0}$, $V_{ave1}$) of 6.0° C./min, after which the temperature was maintained at $T_{cal}$ for 6.6 hours. In other words, the calcination process was performed by adjusting the calcination conditions so that the average temperature ($T_{ave1}$) in the temperature range from 650° C. to $T_{cal}$ was 775° C., the amount of time ($t_1$) for the temperature to rise during this period was 0.69 hours, the average temperature ($T_{ave2}$) when maintaining the temperature at $T_{cal}$ was 900° C., the amount of time ($t_2$) during this maintenance period was 6.6 hours, the crystal growth index ($G_1$) in the temperature range from 650° C. to $T_{cal}$ was 645° C.·$hr^{1/2}$, and the crystal growth index ($G_2$) when maintaining the temperature at $T_{cal}$ was 2312° C.·$hr^{1/2}$.

Next, after the lithium composite oxide particles that were obtained by this kind of calcination process were cooled to room temperature, the lithium composite oxide particles were then crushed using a hammer mill (MF10, manufactured by IKA Japan K.K.) to obtain cathode active material.

[Evaluation of Cathode Active Material]

The cathode active material was analyzed by powder X-ray diffraction that uses CuKα rays using an X-ray diffraction device (X'Pert PRO, manufactured by PANalytical B.V.), and it was confirmed that the cathode active material included single-phase layered hexagonal crystals of lithium composite oxide. Moreover, the ratio of the integrated intensity $I_{i(003)}$ of the diffraction peak on plane (003) with respect to the integrated intensity $I_{i(104)}$ of the diffraction peak on plane (104), or in other words, the integrated intensity ratio $Ii_{(003)}/Ii_{(104)}$ was confirmed to be 1.24. Furthermore, the crystallite size on plane (003) was calculated using the Scherrer Formula from each of the diffraction peaks except for the spread of the diffraction peaks of the X-ray diffraction pattern and confirmed to be 102 nm. The ratio of the intensity $I_{(003)}$ of the diffraction peak on plane (003) with respect to the intensity $I_{(104)}$ of the diffraction peak on plane (104), or in other words the peak intensity ratio $I_{(003)}/I_{(104)}$ was 2.21.

Next, the cathode active material was analyzed using the ICP atomic emission spectrometry analysis device and was confirmed to include lithium composite oxide that included Li at 7.51% by mass, Ni at 19.1% by mass, Co at 19.1 by mass, Mn at 17.9% by mass, and W at 0.91% by mass, and to be expressed by the general formula: $Li_{1.10}Ni_{0.332}Mn_{0.332}Co_{0.331}W_{0.005}O_2$. Moreover, it was confirmed that this cathode active material included $SO_4$ at an amount of 0.57% by mass, Na at 0.036% by mass, Mg at 0.021% by mass and Ca at 0.012% by mass (total of Na, Mg and Ca were included at an amount of 0.069% by mass).

Next, by performing measurement using a laser diffraction and scattering particle size distribution measurement device (Microtrac HRA, manufactured by Nikkiso Co., Ltd), it was conformed that the average particle size of the cathode active material was 5.0 μm. Moreover, by performing measurement using a nitrogen adsorption type BET method measurement device (Quantasorb QS-10, manufactured by Quantachrome Corporation), it was confirmed that the specific surface area of the cathode active material was 1.3 $m^2/g$.

[Production of Rechargeable Battery]

Evaluation of the obtained cathode active material was performed by making a 2032 type coin battery (B) such as described below, and measuring the charging and discharging capacity.

First, 52.5 mg of cathode active material for a non-aqueous electrolyte rechargeable battery, 15 mg of acetylene black, and 7.5 mg of polytetra ethylene resin fluoride (PTFE) were mixed, and then press molded at a pressure of 100 MPa to a diameter of 11 mm and thickness of 100 μm, to form the cathode (electrode for evaluation) (1) illustrated in FIG. 1, and this was then dried for 12 hours at 120° C. in a vacuum drier.

After that, the cathode (1) was used to make a 2032 type coin battery (B) inside a glove box having an Ar atmosphere of which the dew point was controlled at −80° C.

Lithium metal having a diameter of 17 mm and thickness of 1 mm was used for the anode (2) of this 2032 type coin battery (B), and a mixed solution of ethylene carbonate (EC) and di-ethyl carbonate (DEC) mixed at a ratio of 3:7 having 1M $LiPF_6$ as the supporting electrolyte (manufactured by Toyama Pure Chemical Industrial, Ltd.) was used for the electrolyte. Moreover, a porous polyethylene film having a film thickness of 25 μm was used for the separator (3). In addition to the components described above, this 2032 type coin battery (B) included a gasket (4) and a waved washer (5).

[Battery Evaluation]

The 2032 type coin battery that was made, was left after assembly for 24 hours until the Open Circuit Voltage (OCV) was confirmed to be stable. After that, with a charging depth of 20% at 0° C., the battery was charged and discharged for 10 seconds, while changing the current density to be 0.785 $mA/cm^2$, 1.5 $mA/cm^2$, and 3.0 $mA/cm^2$, and the slope with respect to the current density was found from the lowered potential during discharge, the current when the potential lowered to 3V was found, and the DCIR and initial discharge capacity were evaluated. As a result, in Example 1, it was found that the DCIR when the SOC state was 20% was 90 mΩ, and the initial discharge capacity was 157.8 mAh/g.

Moreover, the charge/discharge cycling characteristics of this coin battery (B) were evaluated by performing 25 charge/discharge cycles at 25° C. with the current density being 0.5 $mA/cm^2$ and the cutoff voltage being 4.3 V to 3.0 V, and after that the capacity retention was measured. As a result, it was found that the capacity retention for Example 1 was 91.8%.

The conditions in the calcination process are given in Table 1, the conditions in processing other than the calcination process are given in Table 3, and the characteristics the cathode active material and of a battery that used the cathode active material are given in Table 2 and Table 4.

EXAMPLES 2 to 13, COMPARATIVE EXAMPLES 1 to 6

Except for adjusting the conditions in the calcination process as giving in Table 1, the cathode active materials of Examples 2 to 13 and Comparative Examples 1 to 6 were obtained and evaluated in the same way as in Example 1. By measuring the cathode active materials that were obtained in these examples and comparative examples using an X-ray diffraction device and ICP atomic emission spectrometry analysis device, it was confirmed that all of these cathode active materials included single-phase lithium nickel manganese composite oxide that was expressed by the general formula: $Li_{1.10}Ni_{0.332}Co_{0.331}Mn_{0.332}W_{0.005}O_2$, and had a layered hexagonal crystal structure.

Using these cathode active materials, secondary batteries were produced and evaluated in the same way as in Example 1. The results are given in Table 2.

TABLE 1

| | Atmosphere | Room Temperature to 650° C. | | 650° C.~$T_{cal}$ | | | | | $T_{cal}$ | | | | |
|---|---|---|---|---|---|---|---|---|---|---|---|---|---|
| | | $t_0$ (h) | $V_{ave0}$ (° C./min) | $T_{ave1}$ (° C.) | $t_1$ (h) | $G_1$ (° C.·$h^{1/2}$) | $V_{max1}$ (° C./min) | $V_{ave1}$ (° C./min) | $T_{cal}$ (° C.) | $T_{ave2}$ (° C.) | $t_2$ (h) | $G_2$ (° C.·$h^{1/2}$) | $t_3$ (h) |
| Ex. 1 | Air | 1.71 | 6.0 | 775 | 0.69 | 645 | 6.0 | 6.0 | 900 | 900 | 6.6 | 2312 | 7.3 |
| Ex. 2 | Air | 1.71 | 6.0 | 800 | 0.83 | 730 | 6.0 | 6.0 | 950 | 950 | 9.4 | 2913 | 10.2 |
| Ex. 3 | Air | 1.71 | 6.0 | 800 | 0.83 | 730 | 6.0 | 6.0 | 950 | 950 | 6.4 | 2403 | 7.2 |
| Ex. 4 | Air | 1.71 | 6.0 | 750 | 0.56 | 623 | 6.0 | 6.0 | 850 | 850 | 13.7 | 3146 | 14.3 |
| Ex. 5 | Air | 1.71 | 6.0 | 750 | 0.56 | 623 | 6.0 | 6.0 | 850 | 850 | 9.7 | 2647 | 10.3 |
| Ex. 6 | Air | 3.23 | 3.2 | 775 | 1.30 | 884 | 3.2 | 3.2 | 900 | 900 | 6.6 | 2312 | 7.9 |
| Ex. 7 | Air | 6.08 | 1.7 | 688 | 1.96 | 972 | 10.0 | 1.7 | 850 | 850 | 6.6 | 2312 | 8.6 |
| Ex. 8 | Air | 0.79 | 13.0 | 825 | 0.45 | 553 | 13.0 | 13.0 | 1000 | 1000 | 4.0 | 2000 | 4.5 |
| Ex. 9 | Air | 1.71 | 6.0 | 775 | 0.69 | 645 | 6.0 | 6.0 | 900 | 900 | 12.0 | 3118 | 12.7 |
| Ex. 10 | Air | 1.71 | 6.0 | 825 | 0.97 | 813 | 6.0 | 6.0 | 1000 | 1000 | 3.0 | 1732 | 4.0 |
| Ex. 11 | Air | 1.71 | 6.0 | 750 | 0.56 | 623 | 6.0 | 6.0 | 850 | 850 | 16.0 | 3400 | 16.6 |
| Ex. 12 | Air | 2.46 | 4.2 | 652 | 1.00 | 652 | 18.0 | 4.2 | 900 | 900 | 6.6 | 2312 | 7.6 |
| Ex. 13 | Air | 1.03 | 10.0 | 800 | 0.50 | 566 | 10.0 | 10.0 | 950 | 950 | 4.0 | 1900 | 4.5 |
| CE. 1 | Air | 1.71 | 6.0 | 800 | 0.84 | 733 | 6.0 | 6.0 | 950 | 950 | 21.4 | 4395 | 22.2 |
| CE. 2 | Air | 1.71 | 6.0 | 775 | 0.69 | 644 | 6.0 | 6.0 | 900 | 900 | 21.6 | 4183 | 22.3 |
| CE. 3 | Air | 1.71 | 6.0 | 725 | 0.43 | 475 | 6.0 | 6.0 | 800 | 800 | 13.8 | 2972 | 14.2 |
| CE. 4 | Air | 1.71 | 6.0 | 725 | 0.43 | 475 | 6.0 | 6.0 | 800 | 800 | 21.8 | 3735 | 22.2 |
| CE. 5 | Air | 1.71 | 6.0 | 850 | 1.09 | 887 | 6.0 | 6.0 | 1050 | 1050 | 1.2 | 1150 | 2.3 |
| CE. 6 | Air | 1.71 | 6.0 | 800 | 2.0 | 1131 | 6.0 | 6.0 | 950 | 950 | 6.4 | 2403 | 7.2 |

TABLE 2

| | Cathode Active Material | | | | | | Rechargeable battery | | |
|---|---|---|---|---|---|---|---|---|---|
| | Na, Mg, Ca (% by mass) | $SO_4$ (% by mass) | Peak intensity ratio | Integrated intensity ratio | Crystallite size (nm) | Average particle size (μm) | Specific surface area ($m^2$/g) | DCIR (mΩ) | Initial discharge capacity (mAh/g) | Capacity retention (%) |
| Ex. 1 | 0.069 | 0.57 | 2.21 | 1.24 | 102 | 5.0 | 1.3 | 90 | 157.8 | 91.8 |
| Ex. 2 | 0.067 | 0.56 | 2.24 | 1.21 | 111 | 5.1 | 1.2 | 98 | 158.2 | 92.0 |
| Ex. 3 | 0.065 | 0.54 | 2.18 | 1.22 | 107 | 5.1 | 1.2 | 96 | 157.9 | 91.9 |
| Ex. 4 | 0.072 | 0.59 | 2.18 | 1.21 | 92 | 5.1 | 1.3 | 93 | 157.1 | 91.6 |
| Ex. 5 | 0.075 | 0.59 | 2.28 | 1.23 | 90 | 5.1 | 1.3 | 91 | 157.0 | 91.5 |
| Ex. 6 | 0.068 | 0.55 | 2.31 | 1.27 | 91 | 5.0 | 1.4 | 92 | 157.7 | 91.7 |
| Ex. 7 | 0.070 | 0.58 | 2.23 | 1.21 | 95 | 5.0 | 1.3 | 99 | 157.1 | 91.6 |
| Ex. 8 | 0.068 | 0.57 | 2.20 | 1.23 | 110 | 5.2 | 1.1 | 94 | 154.9 | 91.4 |
| Ex. 9 | 0.068 | 0.55 | 2.22 | 1.22 | 108 | 5.3 | 1.2 | 97 | 157.8 | 91.9 |

TABLE 2-continued

|  | Cathode Active Material | | | | | | | Rechargeable battery | |
|---|---|---|---|---|---|---|---|---|---|
|  | Na, Mg, Ca (% by mass) | SO$_4$ (% by mass) | Peak intensity ratio | Integrated intensity ratio | Crystallite size (nm) | Average particle size (μm) | Specific surface area (m$^2$/g) | DCIR (mΩ) | Initial discharge capacity (mAh/g) | Capacity retention (%) |
| Ex. 10 | 0.069 | 0.54 | 2.29 | 1.26 | 99 | 5.2 | 1.3 | 89 | 154.9 | 91.5 |
| Ex. 11 | 0.071 | 0.59 | 2.15 | 1.20 | 107 | 5.3 | 1.2 | 100 | 157.6 | 91.8 |
| Ex. 12 | 0.068 | 0.57 | 2.22 | 1.23 | 101 | 5.1 | 1.3 | 96 | 154.3 | 90.9 |
| Ex. 13 | 0.067 | 0.56 | 2.24 | 1.28 | 96 | 5.0 | 1.4 | 89 | 155.8 | 91.2 |
| CE. 1 | 0.096 | 0.55 | 2.19 | 1.18 | 121 | 5.0 | 1.0 | 108 | 151.8 | 90.6 |
| CE. 2 | 0.074 | 0.54 | 2.15 | 1.17 | 113 | 5.0 | 1.1 | 112 | 151.2 | 90.4 |
| CE. 3 | 0.075 | 0.56 | 2.01 | 1.16 | 88 | 5.1 | 1.2 | 120 | 147.5 | 89.4 |
| CE. 4 | 0.071 | 0.56 | 2.13 | 1.16 | 89 | 5.1 | 1.2 | 118 | 151.1 | 90.3 |
| CE. 5 | 0.068 | 0.50 | 2.00 | 1.11 | 134 | 5.6 | 0.8 | 128 | 145.3 | 89.1 |
| CE. 6 | 0.065 | 0.54 | 2.02 | 1.13 | 110 | 5.1 | 1.2 | 111 | 157.6 | 91.6 |

EXAMPLES 14 to 17, COMPARATIVE EXAMPLES 7 to 10

Except for adjusting the conditions in the crystallization process, washing process and heat-treatment process as giving in Table 3, the cathode active materials of Examples 14 to 17 and Comparative Examples 7 to 10 were obtained and evaluated in the same way as in Example 1. By measuring the cathode active materials that were obtained in these examples and comparative examples using an X-ray diffraction device and ICP atomic emission spectrometry analysis device, it was confirmed that all of these cathode active materials included single-phase lithium nickel manganese composite oxide that was expressed by the general formula: $Li_{1.10}Ni_{0.332}Co_{0.331}Mn_{0.332}W_{0.005}O_2$, and had a layered hexagonal crystal structure.

Using these cathode active materials, secondary batteries were produced and evaluated in the same way as in Example 1. The results are given in Table 4.

TABLE 3

|  | | Crystallization Process | | | | | Washing Process | Heat-treatment Process | |
|---|---|---|---|---|---|---|---|---|---|
|  | Additional elements | Tank temperature (° C.) | NH$_3$ concentration (g/L) | NaOH aqueous solution (% by mass) | pH value | Dissolved Mg (mg/L) | Dissolved Ca (mg/L) | The number of washing (times) | Atmosphere | Temperature (° C.) |
| Ex. 1 | W | 45 | 10 | 24 | 11.6 | 30 | 20 | 3 | Air | 120 |
| Ex. 14 | W | 45 | 10 | 24 | 11.6 | 10 | 10 | 4 | Air | 120 |
| Ex. 15 | W | 45 | 10 | 24 | 11.1 | 30 | 20 | 2 | Air | 120 |
| Ex. 16 | W | 45 | 10 | 24 | 11.6 | 10 | 10 | 3 | Air | 120 |
| Ex. 17 | W | 45 | 10 | 24 | 11.6 | 50 | 30 | 3 | Air | 120 |
| CE. 6 | W | 45 | 10 | 24 | 11.6 | 30 | 20 | 5 | Air | 120 |
| CE. 7 | W | 45 | 10 | 24 | 11.6 | 30 | 20 | 1 | Air | 120 |
| CE. 8 | W | 45 | 10 | 24 | 11.6 | 5 | 5 | 5 | Air | 120 |
| CE. 9 | W | 45 | 10 | 24 | 11.6 | 70 | 50 | 3 | Air | 120 |

TABLE 4

|  | Crystallization Process | | | | | | Rechargeable battery | |
|---|---|---|---|---|---|---|---|---|
|  | Na, Mg, Ca (% by mass) | SO$_4$ (% by mass) | Integrated intensity ratio | Crystallite size (nm) | Average particle size (μm) | Specific surface area (m$^2$/g) | DCIR (mΩ) | Initial discharge capacity (mAh/g) | Capacity retention (%) |
| Ex. 1 | 0.069 | 0.57 | 1.24 | 102 | 5.0 | 1.3 | 90 | 157.8 | 91.8 |
| Ex. 14 | 0.025 | 0.21 | 1.21 | 115 | 5.1 | 1.2 | 93 | 158.9 | 92.1 |
| Ex. 15 | 0.075 | 0.95 | 1.31 | 93 | 5.0 | 1.3 | 89 | 156.1 | 91.1 |
| Ex. 16 | 0.039 | 0.56 | 1.24 | 105 | 5.0 | 1.3 | 90 | 157.9 | 91.7 |
| Ex. 17 | 0.092 | 0.59 | 1.27 | 98 | 5.0 | 1.3 | 90 | 156.3 | 91.2 |
| CE. 6 | 0.046 | 0.07 | 1.12 | 205 | 5.4 | 0.9 | 121 | 155.1 | 90.9 |
| CE. 7 | 0.092 | 1.15 | 1.17 | 163 | 5.3 | 1.1 | 115 | 150.9 | 90.4 |
| CE. 8 | <0.01 | 0.16 | 1.17 | 154 | 5.3 | 1.0 | 116 | 152.3 | 90.6 |
| CE. 9 | 0.112 | 0.61 | 1.33 | 81 | 5.0 | 1.5 | 103 | 148.6 | 89.5 |

(Evaluation)

In Examples 1 to 17, the production conditions and the amounts of Na, Mg, Ca and $SO_4$ that are included in the cathode active material are within the ranges specified by the present invention, and the integrated intensity ratio is controlled to be 1.20 or greater. This shows that in the cathode active material of Examples 1 to 17, growth in the c-axis direction is predominant over growth in the a-axis direction, and that the surface area of plane "a", which is the reaction plane of Li, is large. Actually, in these examples, when compared with Comparative Examples 1 to 10, it is possible to keep the DCIR to 100 mΩ or less without greatly reducing the initial discharge capacity. Particularly, by adjusting the conditions in the crystallization process, it is possible in Examples 1, 14 and 16, in which the total amount of Na, Mg and Ca included is controlled to be 0.02% by mass to 0.07% by mass, to improve the capacity retention in the charge/discharge cycle of the rechargeable battery.

In Examples 7 and 11, the values of $G_1$ and $G_2$ are greater than values in the suitable ranges, so there is a larger tendency for the DCIR to become large than in the other examples. Moreover, in Examples 8, 10 and 13, the values of $G_1$ and $G_2$ are less than the values in the suitable ranges, and in Example 12 the maximum calcination rate is greater than that of the suitable range, so when compared with the other Examples, there is a tendency for the initial discharge capacity to be small.

However, Comparative Examples 1 to 6 are examples in which at least one of the conditions in the calcination process is outside the range specified by the present invention even though the amounts of Na, Mg, Ca and $SO_4$ included in the cathode active material are within the ranges specified by the invention. Therefore, for the cathode active materials of Comparative Examples 1 to 6, even though the peak intensity ratios are within the range of 2.00 to 2.19, and overlap part of the range of peak intensity ratios of the cathode active materials of Examples 1 to 17, the integrated intensity ratios are all lower than 1.20. From this, it can be confirmed that in the cathode active materials of Comparative Examples 1 to 6, the growth in the a-axis direction is predominant, the surface area of the "a" plane did not become sufficiently large, and by using only evaluation using the peak intensity ratio, it was not possible to sufficiently evaluate growth of the crystal planes. As a result, in Comparative Examples 1 to 6, the DCIR was greater than 100 mΩ, and the input/output characteristics became worse.

On the other hand, Comparative Examples 7 to 10 are examples in which, even though the conditions in the calcination process are within the ranges specified by the present invention, the total amount of Na, Mg and Ca included, or the amount of $SO_4$ included is outside the range specified by the invention. Therefore, in the cathode active material of Comparative Examples 7 to 9, the integrated intensity ratios were 1.20 or less, and the DCIR could not be sufficiently reduced. Moreover, in Comparative Example 10, even though not sufficient, a reduction in the DCIR could be seen, however, at the same time, the initial discharge capacity also greatly decreased.

EXPLANATION OF REFERENCE NUMBERS

1 Cathode
2 Anode
3 Separator
4 Gasket
5 Waved washer

What is claimed is:

1. Cathode active material for a non-aqueous electrolyte rechargeable battery comprising:
    layered hexagonal crystal lithium nickel manganese composite oxide particles that are expressed by the general formula (A): $Li_{1+u}Ni_xMn_yCo_zM_tO_2$ (where $0 \leq u \leq 0.20$, $x+y+z+t=1$, $0.30 \leq x \leq 0.70$, $0.10 \leq y \leq 0.55$, $0 \leq z \leq 0.40$, $0 \leq t \leq 0.10$, and M is selected from one or more elements selected from among Al, Ti, V, Cr, Zr, Nb, Mo, and W); and further includes Na, Mg, Ca and $SO_4$; and wherein the total amount of Na, Mg and Ca included is 0.01% by mass to 0.1% by mass, and the amount of $SO_4$ included is 0.1% by mass to 1.0% by mass;
    sodium ions, magnesium ions and calcium ions are dissolved in Li sites; and
    the ratio of the integrated intensity of the diffraction peak on plane (003) with respect to the integrated intensity of the diffraction peak on plane (104) that were obtained by power X-ray diffraction measurement that uses CuKα rays is 1.20 or greater wherein
    a crystallization process for obtaining nickel manganese composite hydroxide particles that include secondary particles that are formed from an aggregation of plural primary particles, and are expressed by the general formula (B):: $Ni_xMn_yCo_zM_t(OH)_{2+\alpha}$ (where $x+y+z+t=1$, $0.30 \leq x \leq 0.70$, $0.10 \leq y \leq 0.55$, $0 \leq z \leq 0.40$, $0 \leq t \leq 0.10$, $0 \leq \alpha \leq 0.5$, and M is at least one element that is selected from among Al, Ti, V, Cr, Zr, Nb, Mo, and W), and further includes Na, Mg, Ca and $SO_4$, with the total amount of Na, Mg and Ca included being 0.01% by mass to 0.1% by mass, and the amount of $SO_4$ included being 0.1% by mass to 1.0% by mass;
    a mixing process for obtaining a lithium mixture by mixing a lithium compound into the nickel manganese composite hydroxide particles that were obtained in the crystallization process so that the ratio of the number of atoms of Li with respect to the number of atoms of Ni, Mn, Co and M is 1:0.95 to 1.20; and
    a calcination process for obtaining lithium nickel manganese composite oxide particles by performing calcination of the lithium mixture in an oxidizing atmosphere and at a calcination temperature of 850° C. to 1000° C., with $T_{ave1}$ being the average temperature during the temperature rise from 650° C. to the calcination temperature, $t_1$ being the amount of time for the temperature to rise from 650° C. to the calcination temperature, $T_{ave2}$ being the average temperature while the temperature is maintained at the calcination temperature, and $t_2$ being the amount of time that the temperature is maintained at the calcination temperature, and wherein a crystal growth index ($G_1$) that is defined by an Equation (a)

$$\text{Crystal growth index: } G_1 = T_{ave1} \times t_1^{1/2} \quad (a)$$

is controlled so as to be 550° $C.\cdot h^{1/2}$ to 1000° $C.\cdot h^{1/2}$, and a crystal growth index ($G_2$) that is defined by an Equation (b)

$$\text{Crystal growth index: } G_2 = T_{ave2} \times t_2^{1/12} \quad (b)$$

is controlled so as to be 1500° $C.\cdot h^{1/2}$ to 3500° $C.\cdot h^{1/2}$.

2. The cathode active material for a non-aqueous electrolyte rechargeable battery according to claim 1, wherein the crystallite size that is found from the diffraction peak on plane (003) is 80 nm to 200 nm.

3. The cathode active material for a non-aqueous electrolyte rechargeable battery according to claim 1, wherein the average particle size is 3μm to 20μm.

4. A manufacturing method for a cathode active material for a non-aqueous electrolyte rechargeable battery that comprises layered hexagonal crystal lithium nickel manganese composite oxide particles that are expressed by the general formula (A): $Li_{1+u}Ni_xMn_yCo_zM_tO_2$ (where $0 \leq u \leq 0.20$, $x+y+z+t=1$, $0.30 \leq x \leq 0.70$, $0.10 \leq y \leq 0.55$, $0 \leq z \leq 0.40$, $0 \leq t \leq 0.10$, and M is selected from one or more elements selected from among Al, Ti, V, Cr, Zr, Nb, Mo, and W); and further includes Na, Mg, Ca and $SO_4$; comprising:

a crystallization process for obtaining nickel manganese composite hydroxide particles that include secondary particles that are formed from an aggregation of plural primary particles, and are expressed by the general formula (B):: $Ni_xMn_yCo_zM_t(OH)_{2+\alpha}$ (where $x+y+z+t=1$, $0.30 \leq x \leq 0.70$, $0.10 \leq y \leq 0.55$, $0 \leq z \leq 0.40$, $0 \leq t \leq 0.10$, $0 \leq \alpha \leq 0.5$, and M is at least one element that is selected from among Al, Ti, V, Cr, Zr, Nb, Mo, and W), and further includes Na, Mg, Ca and $SO_4$, with the total amount of Na, Mg and Ca included being 0.01% by mass to 0.1% by mass, and the amount of $SO_4$ included being 0.1% by mass to 1.0% by mass;

a mixing process for obtaining a lithium mixture by mixing a lithium compound into the nickel manganese composite hydroxide particles that were obtained in the crystallization process so that the ratio of the number of atoms of Li with respect to the number of atoms of Ni, Mn, Co and M is 1:0.95 to 1.20; and a calcination process for obtaining lithium nickel manganese composite oxide particles by performing calcination of the lithium mixture in an oxidizing atmosphere and at a calcination temperature of 850° C. to 1000° C., with $T_{ave1}$ being the average temperature during the temperature rise from 650° C. to the calcination temperature, $t_{ave2}$ being the amount of time for the temperature to rise from 650° C. to the calcination temperature, $t_{ave2}$ being the average temperature while the temperature is maintained at the calcination temperature, and $t_2$ being the amount of time that the temperature is maintained at the calcination temperature, and wherein a crystal growth index ($G_1$) that is defined by an Equation (a)

$$\text{Crystal growth index: } G_1 = T_{ave1} \times t_1^{1/2} \qquad (a)$$

is controlled so as to be 550° C.·$h^{1/2}$ to 1000° C.·$h^{1/2}$, and a crystal growth index ($G_2$) that is defined by an Equation (b)

$$\text{Crystal growth index: } G_2 = T_{ave2} \times t_2^{1/2} \qquad (b)$$

is controlled so as to be 1500° C.·$h^{1/2}$ to 3500° C.·$h^{1/2}$.

5. The manufacturing method for a cathode active material for a non-aqueous electrolyte rechargeable battery according to claim 4, wherein the crystallization process is a process for crystallizing the nickel manganese composite hydroxide particles by obtaining a reaction aqueous solution by mixing together a mixed aqueous solution in which Ni, Mn, Co and M are included so that the composition ratios are expressed by the general formula (B), an ammonium-ion donor and sodium hydroxide, and controlling the temperature of the reaction aqueous solution to be 35° C. or greater, and the pH value to be 10.5 to 12.0 at a standard liquid temperature of 25° C.; and where of the metal elements of the mixed aqueous solution, at least nickel sulfate and manganese sulfate are used as the nickel source and manganese source.

6. The manufacturing method for a cathode active material for a non-aqueous electrolyte rechargeable battery according to claim 4, wherein the mixed aqueous solution further includes 10 mg/L to 50 mg/L of Mg, and/or 10 mg/L to 30 mg/L of Ca.

7. The manufacturing method for a cathode active material for a non-aqueous electrolyte rechargeable battery according to claim 4, wherein in the calcination process the amount of time for raising the temperature from 650° C. to the calcination temperature is 0.5 hours to 1.8 hours, and the amount of time that the temperature is maintained at the calcination temperature is 4 hours to 15 hours.

8. The manufacturing method for a cathode active material for a non-aqueous electrolyte rechargeable battery according to claim 4, wherein in the calcination process, the amount of time from after the temperature reaches 650° C. to the end of calcination is 5 hours to 15 hours.

9. The manufacturing method for a cathode active material for a non-aqueous electrolyte rechargeable battery according to claim 4, wherein the oxygen concentration in the oxidizing atmosphere is 18% by volume to 100% by volume.

10. The manufacturing method for a cathode active material for a non-aqueous electrolyte rechargeable battery according to claim 4, further comprising a heat-treatment process before the mixing process for performing heat treatment of the nickel manganese composite hydroxide particles at 105° C. to 700° C.

11. The manufacturing method for a cathode active material for a non-aqueous electrolyte rechargeable battery according to claim 4, wherein lithium carbonate, lithium hydroxide or a mixture of these is used as the lithium compound.

12. The manufacturing method for a cathode active material for a non-aqueous electrolyte rechargeable battery according to claim 4, further comprising a crushing process after the calcination process for crushing the lithium nickel manganese composite oxide particles that were obtained in the calcination process.

13. A non-aqueous electrolyte rechargeable battery comprising a cathode, an anode, a separator and a non-aqueous electrolyte, wherein the cathode active material for a non-aqueous electrolyte rechargeable battery according to claim 1 is used as the cathode material of the cathode.

* * * * *